US012597053B2

(12) United States Patent
Nagao et al.

(10) Patent No.: US 12,597,053 B2
(45) Date of Patent: Apr. 7, 2026

(54) ELECTRONIC TRANSACTION MANAGEMENT SYSTEM FOR PROVIDING A TIP

(71) Applicants: Tsukasa Nagao, Shiga (JP); Koki Nagao, Shiga (JP)

(72) Inventors: Tsukasa Nagao, Shiga (JP); Koki Nagao, Shiga (JP)

( * ) Notice: Subject to any disclaimer, the term of this patent is extended or adjusted under 35 U.S.C. 154(b) by 0 days.

(21) Appl. No.: 18/704,421

(22) Filed: Apr. 24, 2024

(65) Prior Publication Data

US 2025/0124473 A1     Apr. 17, 2025

Related U.S. Application Data

(63) Continuation-in-part of application No. PCT/JP2021/040310, filed on Nov. 1, 2021.

(51) Int. Cl.
G06Q 30/0279      (2023.01)
G06Q 30/0282      (2023.01)

(52) U.S. Cl.
CPC ..... G06Q 30/0279 (2013.01); G06Q 30/0282 (2013.01)

(58) Field of Classification Search
None
See application file for complete search history.

(56) References Cited

U.S. PATENT DOCUMENTS

2011/0093399 A1 * 4/2011 Elam, IV ............... G06Q 20/04
                                              705/30
2013/0041733 A1 * 2/2013 Officer ................... G06Q 50/01
                                              705/14.16

(Continued)

FOREIGN PATENT DOCUMENTS

CN       112272309 A     1/2021
CN       112702555 A  *  4/2021   ......... H04N 21/4788

(Continued)

OTHER PUBLICATIONS

JP-2015007915-A machine translation (Year: 2015).*

(Continued)

*Primary Examiner* — Paul S Schwarzenberg
(74) *Attorney, Agent, or Firm* — Juan Carlos A. Marquez; Marquez IP Law Office, PLLC

(57)                ABSTRACT

The present invention provides an electronic transaction management system for providing a tip that enables the users who give tips and the tip recipient to send and receive tips, even when located away from each other; that provides tip distribution to a user randomly selected from all users; that can be expected to improve the interest due to the expectations for the distribution, and as a result, enhance the motivation for users to give tips; that enables increasing the strong sense of connection between the users and the tip recipients; and that enables elevating the mere act of giving tips to a kind of event. An object of the present invention is to provide an electronic transaction management system for providing a tip, the system comprising: a management server, the management server and a user device, wherein the management server comprises a distribution means for distributing an arbitrary percentage, an arbitrary amount, or other forms of an arbitrary tip transferred from the user device, to a recipient of distribution for the tip, a user selected randomly by the management server from all users giving a tip, and distributing the remaining percentage, the remaining amount, or other forms to the tip recipient or the like.

19 Claims, 13 Drawing Sheets

(56)                    References Cited

U.S. PATENT DOCUMENTS

| | | | | |
|---|---|---|---|---|
| 2013/0346170 A1* | 12/2013 | Epstein | .............. | G06Q 30/0226 |
| | | | | 705/14.14 |
| 2015/0193802 A1* | 7/2015 | Tenison | ................ | G06Q 20/24 |
| | | | | 705/14.17 |
| 2020/0023280 A1 | 1/2020 | Onda et al. | | |
| 2020/0334649 A1* | 10/2020 | Veznedaroglu | .... | G06K 7/10722 |
| 2023/0269434 A1* | 8/2023 | Kiyooka | .............. | H04N 21/812 |
| | | | | 386/343 |

FOREIGN PATENT DOCUMENTS

| | | | | |
|---|---|---|---|---|
| JP | 2002109083 A | | | 4/2002 |
| JP | 2015007915 A | * | | 1/2015 |
| JP | 2018171283 A | | | 11/2018 |
| JP | 2020017146 A | | | 1/2020 |
| JP | 2021022339 A | | | 2/2021 |
| JP | 2022127068 A | * | | 8/2022 |

OTHER PUBLICATIONS

CN-112702555-A machine translation (Year: 2021).*
Taiwan First Office Action mailed May 4, 2023 in counterpart
Taiwan application TW111141458, 9 pages in Chinese.
Taiwan Second Office Action mailed Oct. 30, 2023 in counterpart
Taiwan application TW111141458, 2 pages in Chinese.
PCT International Search Report mailed Feb. 15, 2022 in counter-
part PCT application PCT/JP2021/040310, 2 pages in English.

\* cited by examiner

Figure 3:
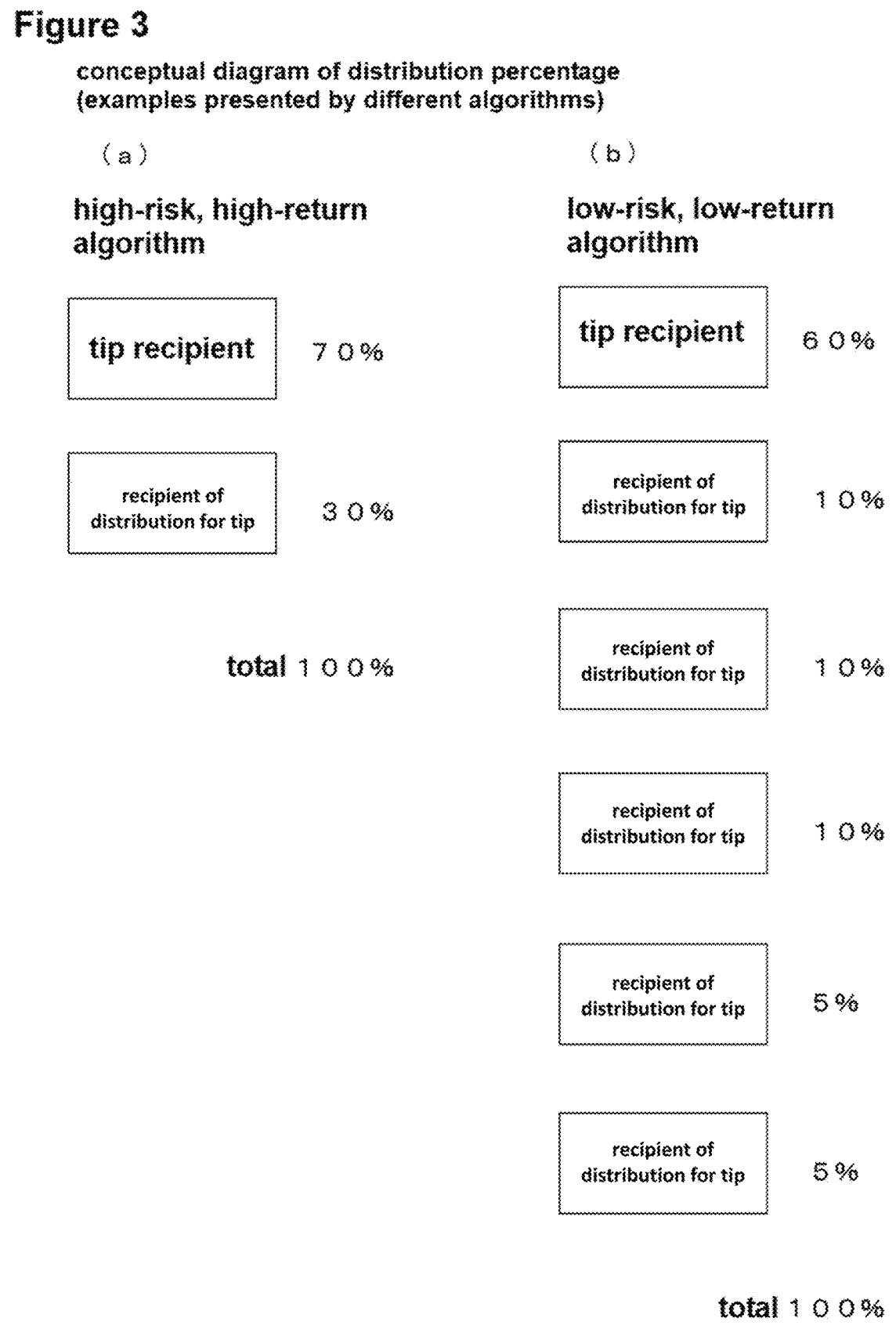

Figure 3 conceptual diagram of distribution percentage
(examples presented by different algorithms)

（ａ） high-risk, high-return algorithm

| tip recipient | 7 0 % |

| recipient of distribution for tip | 3 0 % | total 1 0 0 %

（ｂ） low-risk, low-return algorithm

| tip recipient | 6 0 % |

| recipient of distribution for tip | 1 0 % |

| recipient of distribution for tip | 1 0 % |

| recipient of distribution for tip | 1 0 % |

| recipient of distribution for tip | 5 % |

| recipient of distribution for tip | 5 % | total 1 0 0 %

Figure 5
(a)
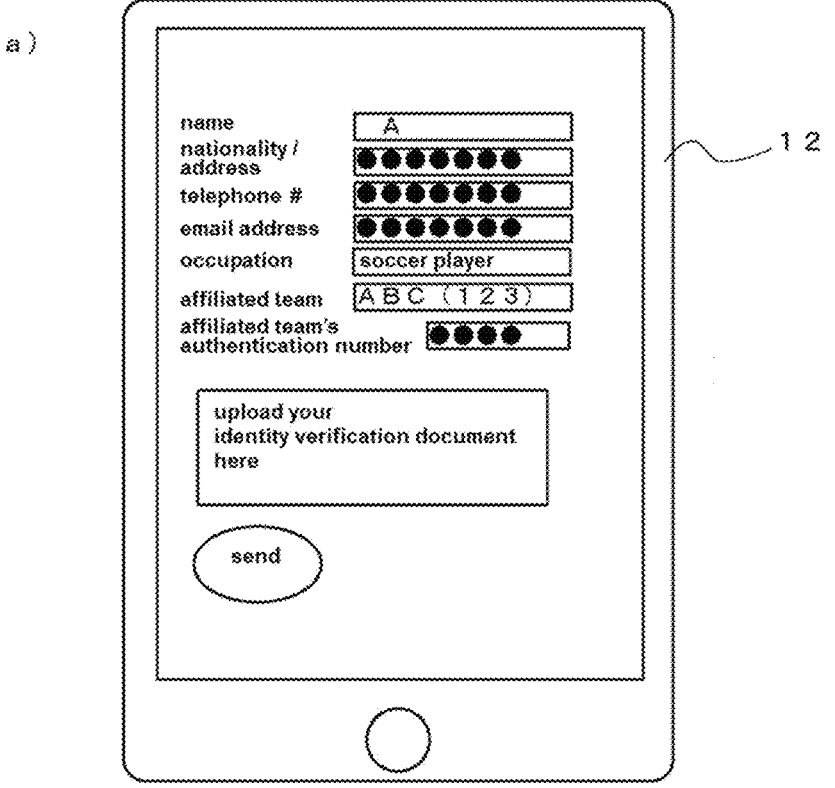
(b)
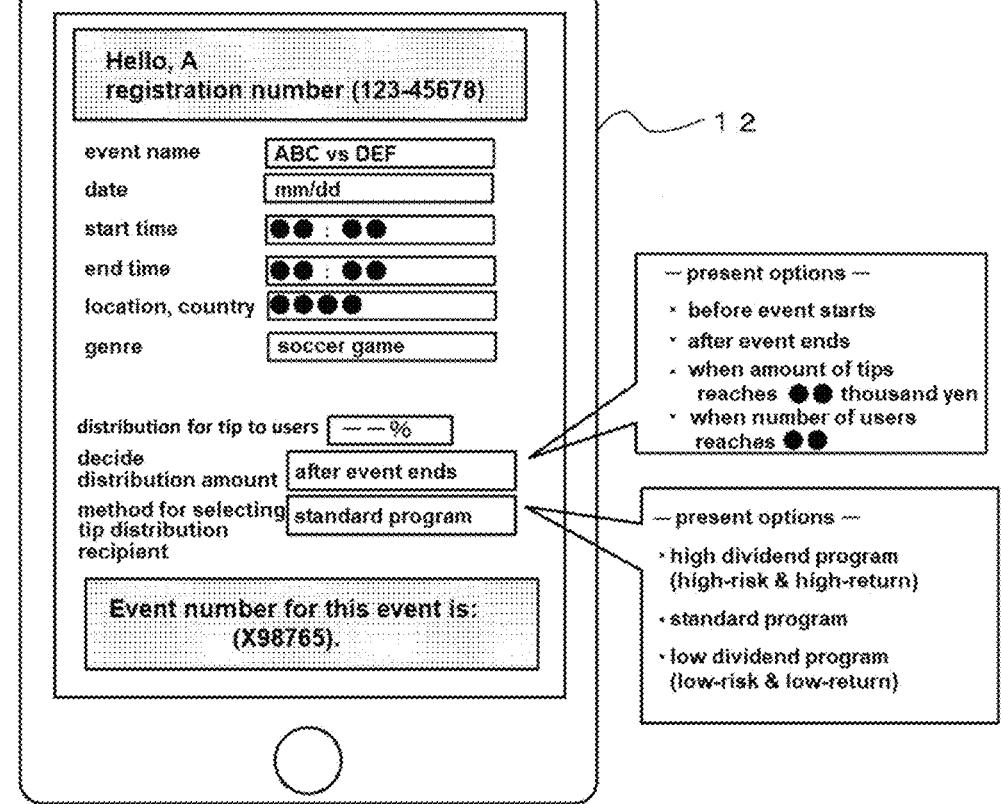

Figure 7
（a）
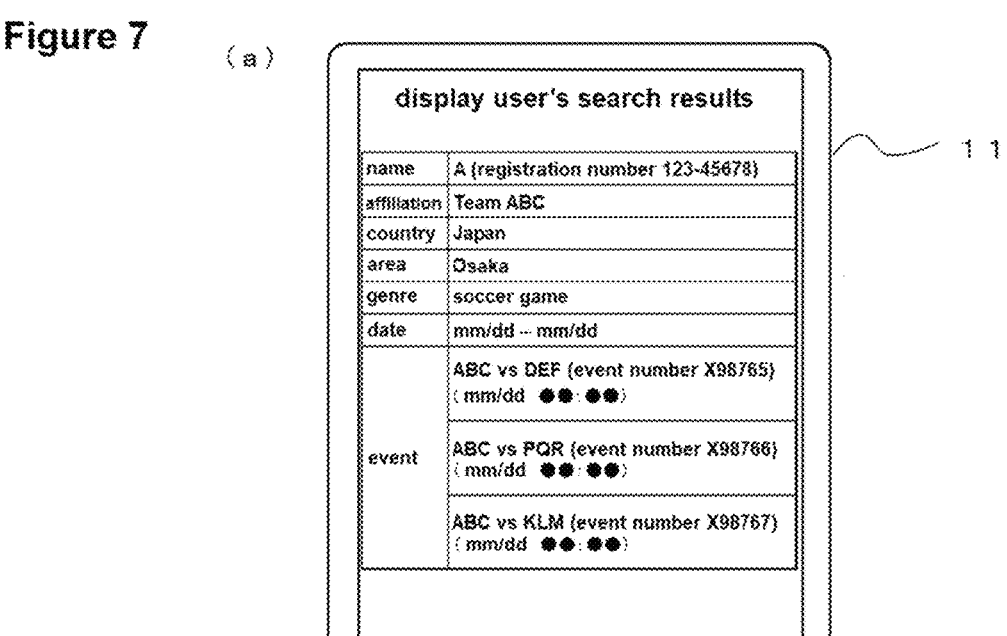
（b）　　　　　　　　　　　　（c）
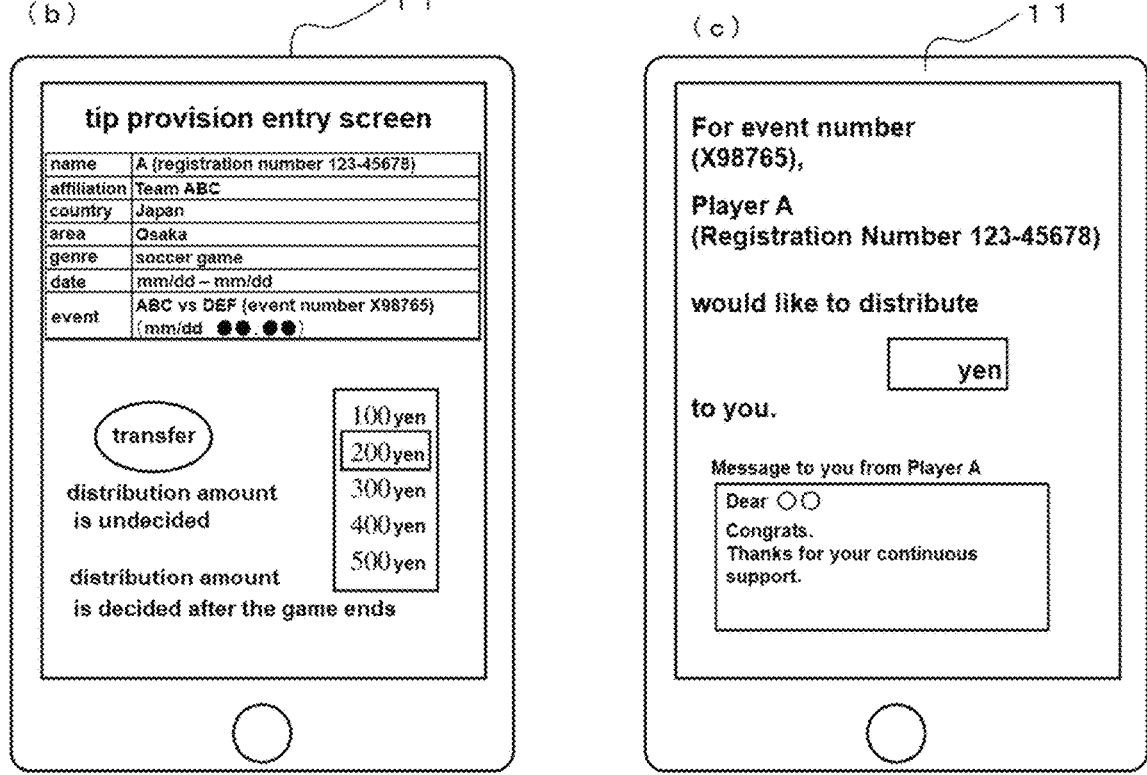

Figure 8

Figure 11
(a)
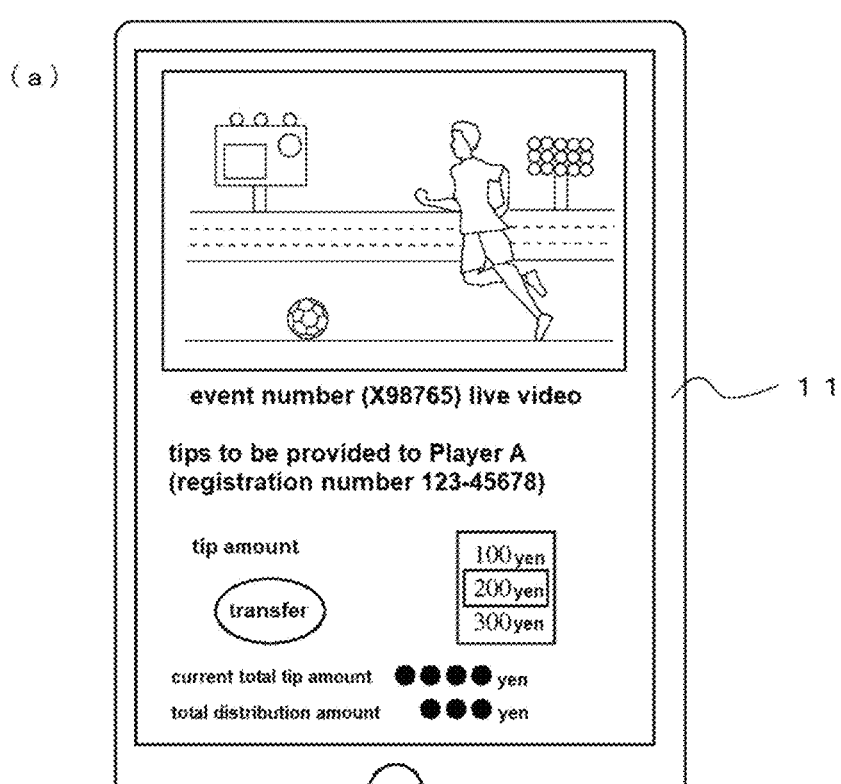
11
(b)
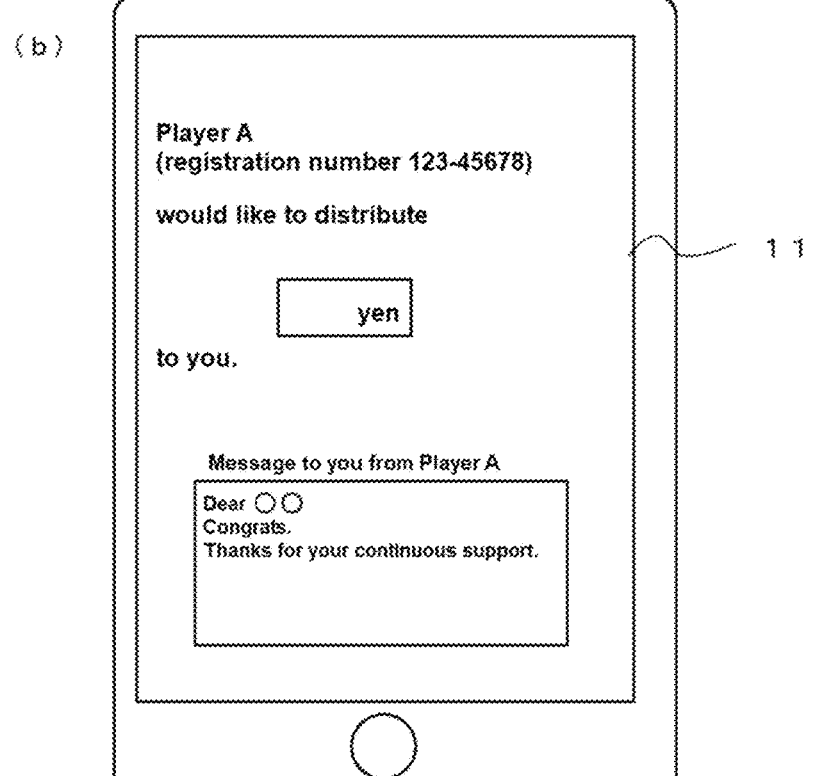
11

ELECTRONIC TRANSACTION MANAGEMENT SYSTEM FOR PROVIDING A TIP

BACKGROUND OF THE INVENTION

Field of the Invention

The present invention relates to an electronic transaction management system for providing a tip.

Description of Related Art

Tips can enhance the motivation of tip recipients for work. Also, they can be a means for expressing gratitude to tip recipients.

First, tips contribute to the improvement of services in the society as well as products, videos, pictures, stories, and the like in which tip recipients are involved. The tip recipients become more enthusiastic to provide higher-quality services and products and demonstrate higher-level performance when tipped by individuals who have received services from the tip recipients or been deeply affected by the tip recipients. Tips function as a motivation to improve the quality of services and products.

Second, tips help to increase the sense of connection between people. Since it becomes apparent from the act of tipping that tippers appreciate tip recipients, the act of tipping creates excitement for tip recipients. This leads to an increase in the sense of connection between tippers and tip recipients. Tips affect people's relationships in the society in such a manner as to bring them closer to each other. Tips act as a social lubricant.

Since, as mentioned above, tips play a role as a lubricant to make the society better, creating more situations to be able to tip in the society can be said to be a reasonable method for making the society better.

However, in recent years, there have been more situations where individuals cannot tip even if they wish. Tips are generally given in person; however, with the development of communication media and the Internet, services are no longer limited to those given in person, and excitement is no longer limited to that given in a place where an individual watches a performer in person. Examples include soccer and Olympics games played in other countries. This causes situations where individuals cannot tip to those they wish to tip to. Since this leads to a decrease in the opportunities to be able to tip in the society, there have been more situations where tips are unlikely to be used to help to increase the motivation of tip recipients for work or tips are unlikely to be used to express gratitude to tip recipients.

Japanese Unexamined Patent Application Publication No. 2021-22339 discloses an electronic transaction system having a settlement process unit for processing settlement of an arbitrary amount of donation (equivalent to a tip) from a tipper for products or services. (In the present electronic transaction system, the user of the system provides a tip, and therefore, the tipper is hereinafter referred to as a user.) This system enables the individual to tip, regardless of how far the individual is located, and therefore, even if there are more situations where users and tip recipients are located far from each other with the development of the communication media and the Internet, opportunities to tip will not decrease in the society.

The above Japanese Unexamined Patent Application Publication No. 2021-22339 discloses an electronic transaction system having a presentation unit for presenting an offer to the user device based on the amount of tip. The electronic transaction management server presents an offer to the user device, which can further enhance the motivation of users for providing tips (donations) while encouraging product/ service provision activities. The enhancement of the motivation for giving tips leads to an increase in the opportunities to tip in the society, and thus, this element (a presentation unit for presenting an offer to the user device based on the amount of tip) allows tips to act as a motivation for improvement of the quality of the services and products as well as a means for expressing gratitude to tip recipients.

However, the offer in the "electronic transaction system having a presentation unit for presenting an offer to the user device" disclosed in Japanese Unexamined Patent Application Publication No. 2021-22339 does not demonstrate outstanding effects in the following aspects.

First, the offer disclosed in Japanese Unexamined Patent Application Publication No. 2021-22339 includes "Name Listed on HP (Website)", "Invitation for Seminar" and the like, which cannot be exchanged for money by the user, either directly or indirectly.

Second, according to Japanese Unexamined Patent Application Publication No. 2021-22339, the offer is uniquely determined based on the amount of tip alone, and thus, the offer is within a pre-established harmonious range for the amount of tip given by the user. In addition, the offer according to Japanese Unexamined Patent Application Publication No. 2021-22339 cannot have a value exceeding the amount of tip provided by the user. The user would never come to believe that some offers may provide a benefit exceeding the amount of tip the user has provided, and thus, when the act of providing a tip is considered as a kind of event, the act of providing a tip as disclosed in the invention according to Japanese Unexamined Patent Application Publication No. 2021-22339 does not at all improve the interest due to the expectations for the distribution for the tip.

As mentioned above, although the invention described in Japanese Unexamined Patent Application Publication No. 2021-22339 can in fact enhance the motivation for users to give tips to some extent, such extent is limited.

BRIEF SUMMARY OF THE INVENTION

Problems to be Solved by the Invention

An object of the present invention is to provide an electronic transaction management system for providing a tip, that enables the users and the tip recipient to smoothly send and receive tips, even when located away from each other; that enables part of the total tips to be distributed to a user randomly selected from all users, that can be expected to improve the interest due to the expectations for the distribution since the amount of the distribution for the tip may have a value exceeding the amount of the tip a user has provided and may be so large that it is unpredictable by the user, and as a result, enhance the motivation for users to give tips; that enables increasing the strong sense of connection between the users and the tip recipients; and that enables elevating the mere act of providing tips to a kind of event.

Means for Solving the Problems

The invention according to a first aspect relates to an electronic transaction management system for providing a tip to a specific individual or entity, the system comprising a management server, a user device corresponding to a tip giver and connected with the management server through a communication line, a tip recipient, a third party designated by the tip recipient, and a system administrator, wherein the user device comprises a transmission means for transmitting, to the management server, a name of the tip recipient that a user wishes to tip, a type of tip, and an amount or a number of points for the tip, being inputted by the user, wherein the management server comprises: a reception means for receiving at least one of the arbitrary type of tip and amount or number of points for the tip, and the name of the tip recipient, all of which are transmitted from the user device; an aggregation means for aggregating types of tips and amounts or numbers of points for the tips for each name of the tip recipient inputted in the reception means; and a distribution means wherein the management server presents one or more groups to classify users, based on at least one of the types of tips and the amounts or the numbers of points for the tips aggregated by the aggregation means; the management server or the tip recipient selects a group to select a recipient of distribution for the tip from the presented groups; and the management server randomly selects a recipient of distribution for the tip from the selected group, distributes an arbitrary percentage, an arbitrary amount, or other forms of the tip to the recipient of distribution for the tip, and distributes a remaining percentage, a remaining amount, or other forms of the tip to at least one of the tip recipient, the third party designated by the tip recipient, and the system administrator, wherein the management server presents, to the tip recipient, a plurality of proposals indicating an arbitrary percentage, an arbitrary amount, or other forms related to the tip to be distributed to the recipient of distribution for the tip, so that the tip recipient can select, prior to the distribution of the tip to the recipient of distribution for the tip, wherein the tip is selected from at least one of cash, points, virtual currency, mark, and message, wherein if cash, points, or virtual currency is selected as the tip, a monetary amount of cash, a monetary amount of virtual currency, or the number of points may be zero.

The invention according to a second aspect relates to the electronic transaction management system of the first aspect, wherein the management server presents, to the tip recipient, a proposal of one or more groups to present a number of recipients of distribution for the tip and a percentage of distribution for the tip so that the tip recipient can select, wherein the selection of the recipient of distribution for the tip is made through random selection within the selected group by the management server.

The invention according to a third aspect relates to the electronic transaction management system of the first aspect, wherein, when users in the selected group are subdivided and grouped based on at least one of the type of tip and the amount or the number of points for the tip, the tip recipient determines, for each subdivided group, at least one of the number of recipients of distribution for the tip to be selected, an amount or percentage of distribution for the tip, a type of tip distribution, and an amount or percentage of distribution for the tip for each recipient of distribution for the tip to be selected.

The invention according to a fourth aspect relates to the electronic transaction management system of the first aspect, comprising an information provision means for allowing the tip recipient to post a video, still image, story, or picture on a website of the system, a copyright of which is owned by the tip recipient, and to provide the video, still image, story, or picture to the user through the website.

The invention according to a fifth aspect relates to the electronic transaction management system of the first aspect, comprising an authentication means for confirming that the tip recipient is the individual.

The invention according to a sixth aspect relates to the electronic transaction management system of the first aspect, comprising a copyright confirmation means for confirming that a copyright of a video, still image, story, or picture posted on a website by the tip recipient belongs to the tip recipient.

The invention according to a seventh aspect relates to the electronic transaction management system of the first aspect, wherein the aggregation means includes a means for displaying, on a website in real time, a total amount of aggregated tips and an amount to be distributed to the recipient of distribution for the tip based on a total amount and a percentage of distribution to the recipient of distribution for the tip.

The invention according to an eighth aspect relates to the electronic transaction management system of the first aspect, wherein the distribution means selects the recipient of distribution for the tip by executing a program for selecting the recipient of distribution for the tip randomly, the program comprising a random number generation means for generating a random number, a table creation means for assigning each user to each random number generated by the random number generation means, and a selection means for selecting a user who has been assigned a random number beyond a reference value, as a recipient of distribution for the tip.

The invention according to a ninth aspect relates to the electronic transaction management system of the first aspect, wherein the management server has a means for allowing the tip recipient to transmit a video, still image, and/or text as a message to either the user or the recipient of distribution for the tip, or both.

The invention according to a tenth aspect relates to the electronic transaction management system of the first aspect, wherein the management server has a means for allowing either the user or the recipient of distribution for the tip, or both to transmit a video, still image, and/or text as a message to the tip recipient.

The invention according to an eleventh aspect relates to an electronic transaction management system for providing a tip to a specific individual or entity, the system comprising a management server, a user device corresponding to a tip giver and connected with the management server through a communication line, a tip recipient, a third party designated by the tip recipient, and a system administrator, wherein the user device comprises a transmission means for transmitting, to the management server, a name of the tip recipient that a user wishes to tip, a type of tip, and an amount or a number of points for the tip, being inputted by the user, wherein the management server comprises: a reception means for receiving at least one of the arbitrary type of tip and amount or number of points for the tip, and the name of the tip recipient, all of which are transmitted from the user device; an aggregation means for aggregating types of tips and amounts or numbers of points for the tips for each name of the tip recipient inputted in the reception means; and a distribution means wherein the management server presents one or more groups to classify users, based on at least one of the types of tips and the amounts or the numbers of points for the tips aggregated by the aggregation means; the management server or the tip recipient selects a group to select a recipient of distribution for the tip from the presented groups; and the management server randomly selects a recipient of distribution for the tip from the selected group, distributes an arbitrary percentage, an arbitrary amount, or other forms of the tip to the recipient of distribution for the tip, and distributes a remaining percentage, a remaining amount, or other forms of the tip to at least one of the tip recipient, the third party designated by the tip recipient, and the system administrator, wherein the management server presents, to the tip recipient, a plurality of proposals indicating an arbitrary percentage, an arbitrary amount, or other forms related to the tip to be distributed to the recipient of distribution for the tip, so that the tip recipient can select, prior to the distribution of the tip to the recipient of distribution for the tip, wherein the tip is selected from at least one of cash, points, virtual currency, mark, and message, wherein if cash, points, or virtual currency is selected as the tip, a monetary amount of cash, a monetary amount of virtual currency, or the number of points may be zero, wherein the management server presents, to the tip recipient, a proposal of one or more groups to present a number of recipients of distribution for the tip and a percentage of distribution for the tip so that the tip recipient can select, wherein the selection of the recipient of distribution for the tip is made through random selection within the selected group by the management server.

The invention according to a twelfth aspect relates to the electronic transaction management system of the eleventh aspect, wherein, when users in the selected group are subdivided and grouped based on at least one of the type of tip and the amount or the number of points for the tip, the tip recipient determines, for each subdivided group, at least one of the number of recipients of distribution for the tip to be selected, an amount or percentage of distribution for the tip, a type of tip distribution, and an amount or percentage of distribution for the tip for each recipient of distribution for the tip to be selected.

The invention according to a thirteenth aspect relates to the electronic transaction management system of the eleventh aspect, comprising an information provision means for allowing the tip recipient to post a video, still image, story, or picture on a website of the system, a copyright of which is owned by the tip recipient, and to provide the video, still image, story, or picture to the user through the website.

The invention according to a fourteenth aspect relates to the electronic transaction management system of the eleventh aspect, comprising an authentication means for confirming that the tip recipient is the individual.

The invention according to a fifteenth aspect relates to the electronic transaction management system of the eleventh aspect, comprising a copyright confirmation means for confirming that a copyright of a video, still image, story, or picture posted on a website by the tip recipient belongs to the tip recipient.

The invention according to a sixteenth aspect relates to the electronic transaction management system of the eleventh aspect, wherein the aggregation means includes a means for displaying, on a website in real time, a total amount of aggregated tips and an amount to be distributed to the recipient of distribution for the tip based on a total amount and a percentage of distribution to the recipient of distribution for the tip.

The invention according to a seventeenth aspect relates to the electronic transaction management system of the eleventh aspect, wherein the distribution means selects the recipient of distribution for the tip by executing a program for selecting the recipient of distribution for the tip randomly, the program comprising a random number generation means for generating a random number, a table creation means for assigning each user to each random number generated by the random number generation means, and a selection means for selecting a user who has been assigned a random number beyond a reference value, as a recipient of distribution for the tip.

The invention according to an eighteenth aspect relates to the electronic transaction management system of the eleventh aspect, wherein the management server has a means for allowing the tip recipient to transmit a video, still image, and/or text as a message to either the user or the recipient of distribution for the tip, or both.

The invention according to a nineteenth aspect relates to the electronic transaction management system of the eleventh aspect, wherein the management server has a means for allowing either the user or the recipient of distribution for the tip, or both to transmit a video, still image, and/or text as a message to the tip recipient.

Effects of the Invention

The invention according to the first aspect is an electronic transaction management system for providing a tip to a specific individual or entity, the system comprising a management server, a user device corresponding to a tip giver and connected with the management server through a communication line, a tip recipient, a third party designated by the tip recipient, and a system administrator, wherein the user device comprises a transmission means for transmitting, to the management server, a name of the tip recipient that a user wishes to tip, a type of tip, and an amount or a number of points for the tip, being inputted by the user, wherein the management server comprises: a reception means for receiving at least one of the arbitrary type of tip and amount or number of points for the tip, and the name of the tip recipient, all of which are transmitted from the user device; and an aggregation means for aggregating types of tips and amounts or numbers of points for the tips for each name of the tip recipient inputted in the reception means, which enables one wishing to tip and the tip recipient to smoothly send and receive tips, even when located away from each other.

The management server comprises a distribution means wherein the management server presents one or more groups to classify users, based on at least one of the types of tips and the amounts or the numbers of points for the tips aggregated by the aggregation means; the management server or the tip recipient selects a group to select a recipient of distribution for the tip from the presented groups; and the management server randomly selects a recipient of distribution for the tip from the selected group, distributes an arbitrary percentage, an arbitrary amount, or other forms of the tip to the recipient of distribution for the tip, and distributes a remaining percentage, a remaining amount, or other forms of the tip to at least one of the tip recipient, the third party designated by the tip recipient, and the system administrator, wherein the management server presents, to the tip recipient, a plurality of proposals indicating an arbitrary percentage, an arbitrary amount, or other forms related to the tip to be distributed to the recipient of distribution for the tip, so that the tip recipient can select, prior to the distribution of the tip to the recipient of distribution for the tip. The amount of distribution for the tip cannot be predicted with respect to the amount of tip given by the user, but rather it may be beyond the amount of tip provided by the user, which can lead the user to come to believe that there may be a small possibility of being able to gain a benefit from the distribution. The act of providing a tip, when considered as a kind of event, can be expected to improve the interest in the event, and thus, enhance the motivation for users to give tips.

The tip is selected from at least one of cash, points, virtual currency, mark, and message, wherein if cash, points, or virtual currency is selected as the tip, a monetary amount of cash, a monetary amount of virtual currency, or the number of points may be zero, which enables a large number of users to offer their support to a specific individual or entity, regardless of the type of tip and the amount or the number of points for the tip.

The invention according to the second aspect is characterized that the management server presents, to the tip recipient, a proposal of one or more groups to present a number of recipients of distribution for the tip and a percentage of distribution for the tip so that the tip recipient can select, wherein the selection of the recipient of distribution for the tip is made through random selection within the selected group by the management server, and thus, the amount of distribution for the tip cannot be predicted with respect to the amount of tip given by the user, but rather it may be beyond the amount of tip provided by the user. Therefore, the user can come to believe that there may be a small possibility of being able to gain a benefit if chosen as a recipient of distribution for the tip, and the act of providing a tip, when considered as a kind of event, can be expected to improve the interest. This can enhance the motivation for users to give tips.

The invention according to the third aspect is characterized that, when users in the selected group are subdivided and grouped based on at least one of the type of tip and the amount or the number of points for the tip, the tip recipient determines, for each subdivided group, at least one of the number of recipients of distribution for the tip to be selected, an amount or percentage of distribution for the tip, a type of tip distribution, and an amount or percentage of distribution for the tip for each recipient of distribution for the tip to be selected, which enables the tip recipient to distribute the tip to the recipient of distribution for the tip in various ways.

The invention according to the fourth aspect is characterized by comprising an information provision means for allowing the tip recipient to post a video, still image, story, or picture on a website of the system, a copyright of which is owned by the tip recipient, and to provide the video, still image, story, or picture to the user through the website, which allows the user to watch the visual work posted on the information provision means and provide tips to the creator of the visual work when he/she is impressed by the visual work.

The invention according to the fifth aspect is characterized by comprising an authentication means for confirming that the tip recipient is the individual, which prevents a non-party from impersonating the tip recipient to receive the tips. Thus, the present invention can provide a highly reliable and safe system that allows the user to give tips to the one he/she wishes. A conceivable embodiment may be, for example, a tip recipient authenticates himself/herself by using a pre-authenticated password and logging into the present electronic transaction management system for providing a tip.

The invention according to the sixth aspect is characterized by comprising a copyright confirmation means for confirming that a copyright of a video, still image, story, or picture posted on a website by the tip recipient belongs to the tip recipient, which can prevent troubles in advance, such as the tip recipient posting other individual's work on the website and receiving tips that the tip recipient should not have received, and thus, can provide a highly reliable and safe system.

The invention according to the seventh aspect is characterized that the aggregation means includes a means for displaying, on a website in real time, a total amount of aggregated tips and an amount to be distributed to the recipient of distribution for the tip based on a total amount and a percentage of distribution to the recipient of distribution for the tip, which allows the user to view the act of providing a tip as an entertainment, and thus, can be expected to improve the interest. As a result, this can enhance the motivation for users to give tips.

The invention according to the eighth aspect is characterized that the distribution means selects the recipient of distribution for the tip by executing a program for selecting the recipient of distribution for the tip randomly, the program comprising a random number generation means for generating a random number, a table creation means for assigning each user to each random number generated by the random number generation means, and a selection means for selecting a user who has been assigned a random number beyond a reference value, as a recipient of distribution for the tip, which enables the change of the selection criteria through the change of the program to render a selection unpredictable for the user.

The invention according to the ninth aspect is characterized that the management server has a means for allowing the tip recipient to transmit a video, still image, and/or text as a message to either the user or the recipient of distribution for the tip, or both, which allows the tip recipient to express the sense of connection to the recipient of distribution for the tip. In addition, if the message can be shown to others, it becomes a kind of event, and the recipient of distribution for the tip finds the message itself greatly valuable.

The invention according to the tenth aspect is characterized that the management server has a means for allowing either the user or the recipient of distribution for the tip, or both to transmit a video, still image, and/or text as a message to the tip recipient, which allows the recipient of distribution for the tip to express gratitude to the tip recipient. If the message is public to other users, the recipient of distribution for the tip can liven up the tip provision and the distribution for the tip as an event.

The invention according to the eleventh aspect is an electronic transaction management system for providing a tip to a specific individual or entity, the system comprising a management server, a user device corresponding to a tip giver and connected with the management server through a communication line, a tip recipient, a third party designated by the tip recipient, and a system administrator, wherein the user device comprises a transmission means for transmitting, to the management server, a name of the tip recipient that a user wishes to tip, a type of tip, and an amount or a number of points for the tip, being inputted by the user, wherein the management server comprises: a reception means for receiving at least one of the arbitrary type of tip and amount or number of points for the tip, and the name of the tip recipient, all of which are transmitted from the user device; and an aggregation means for aggregating types of tips and amounts or numbers of points for the tips for each name of the tip recipient inputted in the reception means, which enables one wishing to tip and the tip recipient to smoothly send and receive tips, even when located away from each other.

The management server comprises a distribution means wherein the management server presents one or more groups to classify users, based on at least one of the types of tips and the amounts or the numbers of points for the tips aggregated by the aggregation means; the management server or the tip recipient selects a group to select a recipient of distribution for the tip from the presented groups; and the management server randomly selects a recipient of distribution for the tip from the selected group, distributes an arbitrary percentage, an arbitrary amount, or other forms of the tip to the recipient of distribution for the tip, and distributes a remaining percentage, a remaining amount, or other forms of the tip to at least one of the tip recipient, the third party designated by the tip recipient, and the system administrator, wherein the management server presents, to the tip recipient, a plurality of proposals indicating an arbitrary percentage, an arbitrary amount, or other forms related to the tip to be distributed to the recipient of distribution for the tip, so that the tip recipient can select, prior to the distribution of the tip to the recipient of distribution for the tip. The amount of distribution for the tip cannot be predicted with respect to the amount of tip given by the user, but rather it may be beyond the amount of tip provided by the user, which can lead the user to come to believe that there may be a small possibility of being able to gain a benefit from the distribution. The act of providing a tip, when considered as a kind of event, can be expected to improve the interest in the event, and thus, enhance the motivation for users to give tips.

The tip is selected from at least one of cash, points, virtual currency, mark, and message, wherein if cash, points, or virtual currency is selected as the tip, a monetary amount of cash, a monetary amount of virtual currency, or the number of points may be zero, which enables a large number of users to offer their support to a specific individual or entity, regardless of the type of tip and the amount or the number of points for the tip.

The management server presents, to the tip recipient, a proposal of one or more groups to present a number of recipients of distribution for the tip and a percentage of distribution for the tip so that the tip recipient can select, and the selection of the recipient of distribution for the tip is made through random selection within the selected group by the management server, and thus, the amount of distribution for the tip cannot be predicted with respect to the amount of tip given by the user, but rather it may be beyond the amount of tip provided by the user. Therefore, the user can come to believe that there may be a small possibility of being able to gain a benefit if chosen as a recipient of distribution for the tip, and the act of providing a tip, when considered as a kind of event, can be expected to improve the interest. This can enhance the motivation for users to give tips.

The invention according to the twelfth aspect is characterized that, when users in the selected group are subdivided and grouped based on at least one of the type of tip and the amount or the number of points for the tip, the tip recipient determines, for each subdivided group, at least one of the number of recipients of distribution for the tip to be selected, an amount or percentage of distribution for the tip, a type of tip distribution, and an amount or percentage of distribution for the tip for each recipient of distribution for the tip to be selected, which enables the tip recipient to distribute the tip to the recipient of distribution for the tip in various ways.

The invention according to the thirteenth aspect is characterized by comprising an information provision means for allowing the tip recipient to post a video, still image, story, or picture on a website of the system, a copyright of which is owned by the tip recipient, and to provide the video, still image, story, or picture to the user through the website, which allows the user to watch the visual work posted on the information provision means and provide tips to the creator of the visual work when they are impressed by the visual work.

The invention according to the fourteenth aspect is characterized by comprising an authentication means for confirming that the tip recipient is the individual, which prevents a non-party from impersonating the tip recipient to receive the tips. Thus, the present invention can provide a highly reliable and safe system that allows the user to give tips to the one he/she wishes. A conceivable embodiment may be, for example, a tip recipient authenticates himself/herself by using a pre-authenticated password and logging into the present electronic transaction management system for providing a tip.

The invention according to the fifteenth aspect is characterized by comprising a copyright confirmation means for confirming that a copyright of a video, still image, story, or picture posted on a website by the tip recipient belongs to the tip recipient, which can prevent troubles in advance, such as the tip recipient posting other individual's work on the website and receiving tips that the tip recipient should not have received, and thus, can provide a highly reliable and safe system.

The invention according to the sixteenth aspect is characterized that the aggregation means includes a means for displaying, on a website in real time, a total amount of aggregated tips and an amount to be distributed to the recipient of distribution for the tip based on a total amount and a percentage of distribution to the recipient of distribution for the tip, which allows the user to view the act of providing a tip as an entertainment, and thus, can be expected to improve the interest. As a result, this can enhance the motivation for users to give tips.

The invention according to the seventeenth aspect is characterized that the distribution means selects the recipient of distribution for the tip by executing a program for selecting the recipient of distribution for the tip randomly, the program comprising a random number generation means for generating a random number, a table creation means for assigning each user to each random number generated by the random number generation means, and a selection means for selecting a user who has been assigned a random number beyond a reference value, as a recipient of distribution for the tip, which enables the change of the selection criteria through the change of the program to render a selection unpredictable for the user.

The invention according to the eighteenth aspect is characterized that the management server has a means for allowing the tip recipient to transmit a video, still image, and/or text as a message to either the user or the recipient of distribution for the tip, or both, which allows the tip recipient to express the sense of connection, appeal, or gratitude to the user or the recipient of distribution for the tip. In addition, if the message can be shown to others, it becomes a kind of event, and the recipient of distribution for the tip finds the message itself greatly valuable.

The invention according to the nineteenth aspect is characterized that the management server has a means for allowing either the user or the recipient of distribution for the tip, or both to transmit a video, still image, and/or text as a message to the tip recipient, which allows the user or the recipient of distribution for the tip to express gratitude to the tip recipient. If the message is public to other users, the recipient of distribution for the tip can liven up the tip provision and the distribution for the tip as an event.

BRIEF DESCRIPTION OF DRAWINGS

FIG. 3 is a view illustrating an example of a selection algorithm for selecting the recipient of distribution for the tip, of an electronic transaction management system for providing a tip in accordance with the present invention. Part (a) shows an example of a high-risk, high-return type algorithm. Part (b) shows an example of a low-risk, low-return type algorithm.

FIG. 5 is a view illustrating a device screen of the first embodiment of the electronic transaction management system for providing a tip in accordance with the present invention. Part (a) shows the tip recipient's registration screen, and part (b) shows the tip recipient's event registration screen.

FIG. 7 is a view illustrating a device screen of the first embodiment of the electronic transaction management system for providing a tip in accordance with the present invention. Part (a) shows the user's search screen, part (b) shows the user's tip provision entry screen, and part (c) shows the tip distribution receipt screen of the recipient of distribution for the tip.

FIG. 8 is a view illustrating an exemplary configuration of a second embodiment of an electronic transaction management system for providing a tip in accordance with the present invention.

FIG. 11 is a view illustrating a device screen of a third embodiment of an electronic transaction management system for providing a tip in accordance with the present invention. Part (a) shows the user's tip provision screen on which a live video is provided by the tip recipient, and part (b) shows a tip distribution receipt screen.

DETAILED DESCRIPTION OF THE INVENTION

Embodiments of an electronic transaction management system for providing a tip according to the present invention are described in details below, with reference to the accompanying drawings.

Tips play a role as a lubricant to make the society better, and their forms are not particularly limited as long as it can increase the strong sense of connection between the users and the tip recipients. Examples of forms of tips may include cash, points, virtual currency, marks, messages, etc. A tip can be provided to the tip recipient even if the amount or number of cash, points, or virtual currency for the tip is zero, and the transaction can be recorded. Such mechanism for the case of that the amount or number of cash, points, or virtual currency is zero, is provided for the users who cannot provide a tip such as cash but want to show the tip recipient their willingness to support the tip recipient. A user, who is a tip giver, can provide tips to multiple different tip recipients. The user can also provide tips to multiple events at the same or different times. The user can provide tips to a tip recipient multiple times for the same event. The user can provide multiple different forms of tips to tip recipients at the same or different times.

It is preferable that the marks and messages to be provided to the tip recipient can indicate supports, encouragements, or improvements to the tip recipient. The marks and messages may be a form that can be converted into tips to be provided to tip recipients by spending the user's cash, points, and/or virtual currency. There may be different types in the marks. The user can provide tip recipients with multiple types of marks. The user can also purchase marks by spending cash, points, and/or virtual currency. The user can also spend cash, points, and/or virtual currency to provide a message including more numbers of characters to the tip recipient as compared to the non-spending case.

First Embodiment

Figure 1:
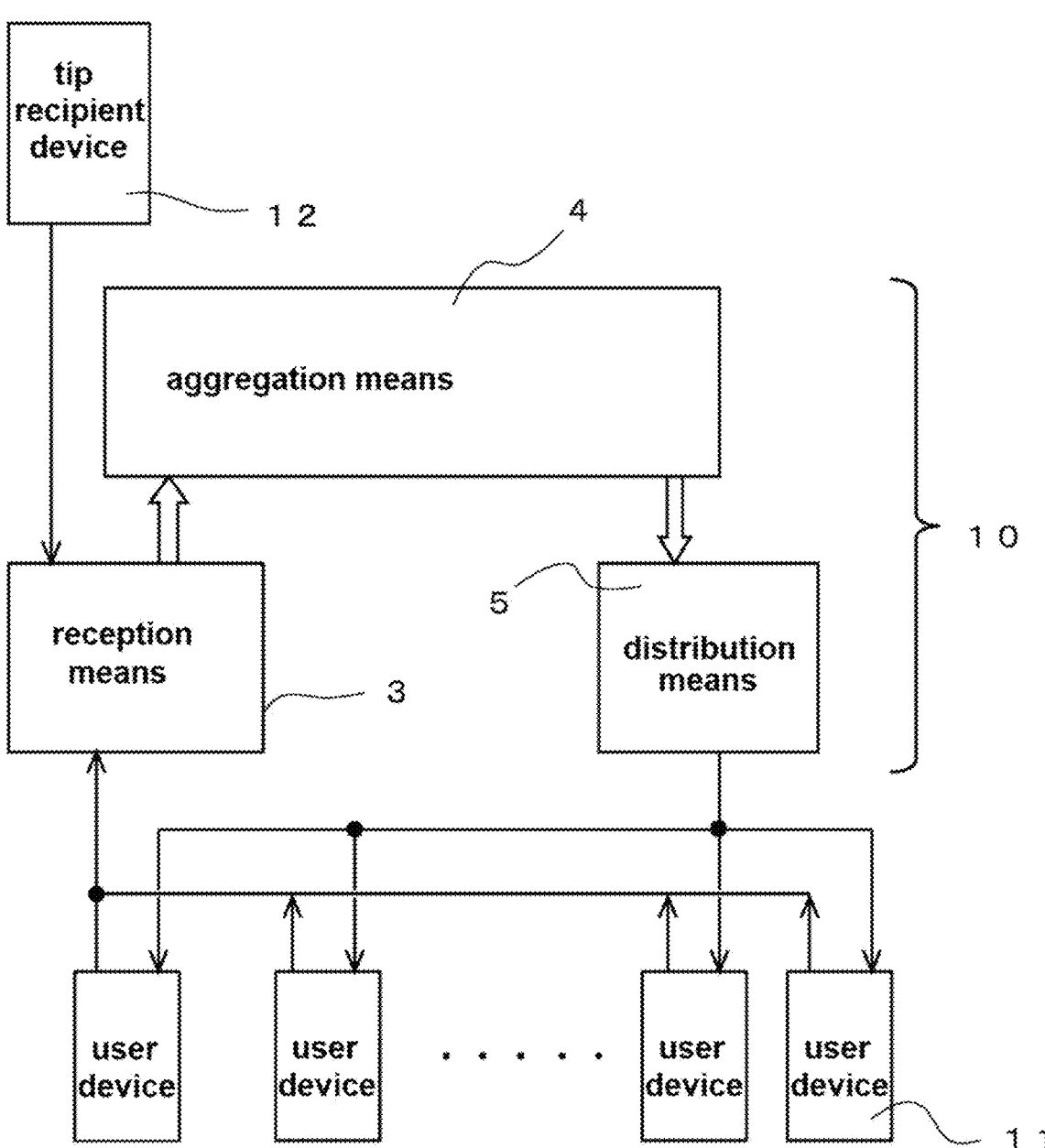
FIG. 1 is a view illustrating an exemplary configuration of a first embodiment of an electronic transaction management system for providing a tip in accordance with the present invention.

FIG. 1 shows an exemplary configuration of the most fundamental embodiment of an electronic transaction management system (1) for providing a tip. The system comprises a management server (10) as well as a large number of user devices (11) and tip recipient devices (12). The management server (10) may be a mainframe in a large-scale data center. The user devices (11) and the tip recipient devices (12) may be PCs or mobile devices connected with the management server (10) through the Internet line.

For facilitating the understanding, the form of tip selected in the first embodiment is assumed to be (electronic) cash.

The user devices (11) are operated by an unspecified large number of users (21). A user (21) determines a tip recipient (20) and an amount of tip to be provided, and transmits these to the management server (10) through the user device (11).

The tip recipient device (12) is operated by the tip recipient (20). The tip recipient (20) performs registration of the tip recipient (20) and registration of an event through the tip recipient device (12).

The management server (10) is equipped with a reception means (3), an aggregation means (4), and a distribution means (5).

The reception means (3) receives the name of the tip recipient (20) and the amount of tip that the user (21) intends to tip, both of which have been transmitted from the user device (11). The reception means (3) further performs the process of the registration information of the tip recipient

(20) transmitted from the tip recipient device (12) to the system, and the registration process of event launched by the tip recipient (20). The aggregation means (4) aggregates the amount of tips provided from the users (21) for each tip recipient (20). Prior to the aggregation of tips by the aggregation means (4), the tip recipient (20) or the system administrator (24) can inform the user (21), in advance, of the upper limit of tips to be provided to the tip recipient (20), such as the upper limit of the amount of cash, amount of virtual currency, number of points, number of marks, or messages (such as the maximum times of transmission or the maximum number of words), and/or the cut-off date and time for tip provision. In the first embodiment, it is conceivable for an aspect that the tip recipient (20) or the system administrator (24) may inform the user (21) of the upper limit of the amount of cash and the cut-off date and time.

The user (21) can accumulate the tips up to the upper limit of tips, such as the upper limit of the amount of cash, amount of virtual currency, number of points, number of marks, or messages (such as the maximum times of transmission or the maximum number of words) to be provided to the tip recipient (20). In the first embodiment, it is conceivable for an aspect that the user (21) accumulates tips up to the upper limit of the amount and by the cut-off date and time.

The distribution means (5) performs the distribution for the tips aggregated for each tip recipient (20) to users (21).

The distribution may not be made equally to all users (21). While a user (21) may receive a large amount of distribution, another user (21) may receive only a small amount of distribution. Still another user (21) may not receive any distribution at all. The selection of the users (21) receiving distribution as well as the decision of the amount of distribution may be made through random selection by the management server (10).

Figure 2:
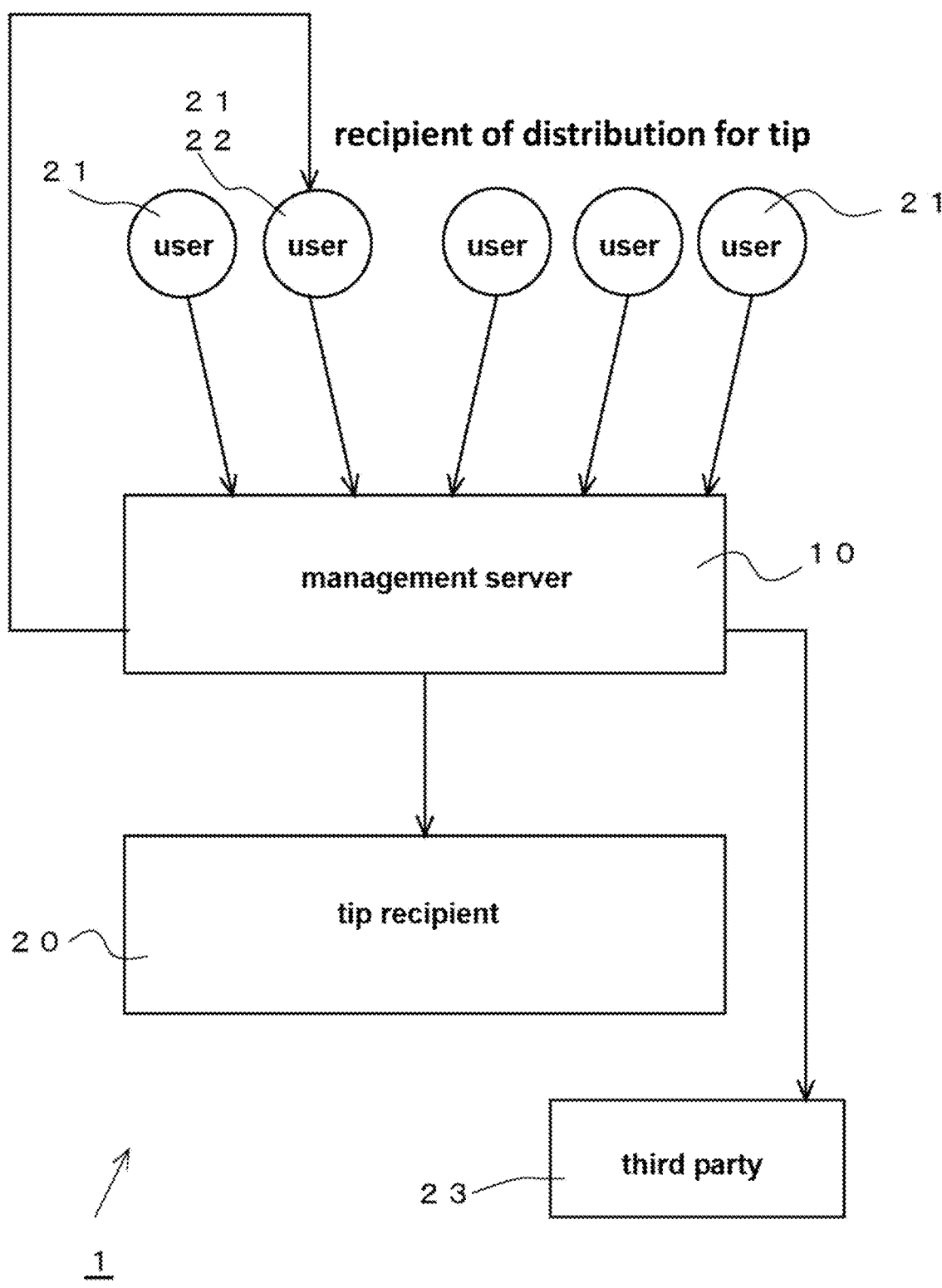
FIG. 2 is a view illustrating a tip flow of the first embodiment of the electronic transaction management system for providing a tip in accordance with the present invention.

FIG. 2 shows the tip flow focused on the distribution for the tip as mentioned above. Tips are collected from a large number of users and then distributed to a user selected from all users (hereinafter, referred to as a recipient of distribution for the tip (22)) and/or to a third party (23) by the distribution means of the management server (10). The distribution to a third party (23) is discussed later. FIG. 2 shows an example of a state in which the recipients of distribution for the tip (22) are one user among five users (21) and one third party (23). After the distribution from the total amount of tips is made to the recipients of distribution for the tip, the remaining amount is sent to the tip recipient (20).

After the distribution from the total amount of tips is made to the recipients of distribution for the tip, the remaining amount may also be given to at least one of the tip recipient (20), the third party (23) designated by the tip recipient, and the system administrator (24).

Also, prior to the distribution to the recipients of distribution for the tip, an arbitrary amount from the total amount of aggregated tips may be distributed to the system administrator (24) upon completion of the aggregation of tips. In such case, after deducting the amount distributed to the system administrator (24) from the total amount of tips, the remaining amount is to be distributed to the recipients of distribution for the tip in an arbitrary percentage, an arbitrary amount, or a form thereof. After the distribution to the recipient of distribution for the tip is completed, the remaining percentage, an arbitrary amount, or a form thereof is then distributed to the tip recipient (20), the third party (23) designated by the tip recipient, or both.

The probability that the recipient of distribution for the tip (22) will receive a large amount of the distribution may be high for users (21) who have provided large amounts as tips, whereas the probability may be low for users (21) who have provided small amounts as tips. Through the use of this configuration, fairness is ensured for users (21) having paid larger amounts. The selection of the recipient of distribution for the tip (22) in a fair manner enhances the motivation of users (21) for giving tips.

The management server (10) may have one or more programs that execute different algorithms for the random selection method. The management server (10) may present one or more proposals (presented proposals or presented groups) to the tip recipient (20) so that the tip recipient (20) can select his/her preferable proposal. An algorithm (or program) is to be executed based on the proposal selected (or the group selected) by the tip recipient (20).

This program comprises a random number generation means for generating a random number, a table creation means for assigning each user to each random number generated by the random number generation means, and a selection means for selecting a user who has been assigned a random number beyond a reference value, as a recipient of distribution for the tip (22). When the reference value is set closer to the upper limit of the range of generated random numbers, the number of selected recipients of distribution for the tip (22) decreases. In return, the amount of distribution received by each recipient of distribution for the tip (22) increases. This program serves as a high-risk, high-return type selection means. When the reference value is set farther from the upper limit of the range of generated random numbers, the number of selected recipients of distribution for the tip (22) increases. In return, the amount of distribution received by each decreases. In this case, the program serves as a low-risk, low-return type selection means.

When distributing tips, the management server (10) presents one or more groups (or may also be referred to as one or more large groups) to classify users (the one or more groups (or the one or more large groups) presented by the management server (10) may also be referred to as a presented proposal), the management server (10) or the tip recipient (20) selects a group to select (or a large group to select) a recipient of distribution for the tip (22) from the presented groups (or the presented large groups), and the management server (10) randomly selects a recipient of distribution for the tip (22) from the selected group (or the selected large group). The group (or the large group) can be determined based on, for example, but not limited to, the type of tip, the amount or the number of points for the tip, or the number of users, as well as other method arbitrarily set by the user of the present invention (e.g., the tip recipient (20)). A user can be selected as a recipient of distribution for the tip (22) even if the amount of cash, the amount of virtual currency, or the number of points for the tip he/she gives is zero. The users in the selected group (or the selected large group) can be subdivided based on, for example, the type of tip, the amount or the number of points for the tip, and the number of users, as well as other method arbitrarily set by the user of the present invention (e.g., the tip recipient (20)), and further divided into one or more groups. When the users are subdivided into groups (the subdivided group may also be referred to as a small group), the tip recipient (20) can determine, for each subdivided group (or small group), at least one of the number of recipients of distribution for the tip (22) to be selected, the amount or percentage of distribution for the tip, the type of tip distribution, and the amount or percentage of distribution for the tip for each recipient of distribution for the tip (22) to be selected. This enables selecting a plurality of recipients of distribution for the tip (22) from a single (same) small group, or selecting one or more recipients of distribution for the tip (22) from each of a plurality of (different) small groups. When there is more than one recipient of distribution for the tip (22) in a same small group, the user of the present invention (e.g., the tip recipient (20)) can arbitrarily set, for example, the type of tip to be distributed, the amount of tip distribution, the percentage of distribution for the tip, or the number of points for the tip, for the distribution to each recipient of distribution for the tip (22).

As a first example, it is conceivable for an aspect that when more than one recipient of distribution for the tip (22) (e.g., recipient of distribution for the tip A (22) and recipient of distribution for the tip B (22)) is selected by the management server in a group (or large group) that has not been subdivided, recipient of distribution for the tip A (22) is to be distributed with points and recipient of distribution for the tip B (22) is to be distributed with text.

As a second example, it is conceivable for an aspect that when the recipients of distribution for the tip (22) selected by the management server are in more than one small group separately (e.g., small group A and small group B), the recipient of distribution for the tip (22) in small group A is to be distributed with cash and the recipient of distribution for the tip (22) in small group B is to be distributed with a video.

As a third example, it is conceivable for an aspect that when the recipients of distribution for the tip (22) selected by the management server are in more than one small group separately, (e.g., small group A and small group B), and furthermore, there is more than one recipient of distribution for the tip (22) in each small group (e.g., recipient of distribution for the tip A (22) and recipient of distribution for the tip B (22) in small group A, recipient of distribution for the tip C (22) and recipient of distribution for the tip D (22) in small group B), recipients of distribution for the tip (22) in small group A are to be distributed with cash or still image, and recipients of distribution for the tip (22) in small group B are to be distributed with cash, points, still image, or video; wherein recipient of distribution for the tip A (22) is to be distributed with cash and recipient of distribution for the tip B (22) is to be distributed with a still image, and recipient of distribution for the tip C (22) is to be distributed with cash and recipient of distribution for the tip D (22) is to be distributed with a video. In this case (i.e., in the third example), the user of the present invention (e.g., the tip recipient (20)) may set (or present) more than one form of tip distribution for each small group, and the recipient of distribution for the tip (22) may arbitrarily select therefrom; or the user of the present invention (e.g., the tip recipient (20)) may select the form of tip for each recipient of distribution for the tip (22).

Here, the term "large group" is used here to differentiate it from the term "small group" that is used to describe a group subdivided from the group selected by the management server (10) or the tip recipient (20), and in this case, the selected "group" is referred to as a "large group".

The tip distribution can be set by the user (e.g., tip recipient (20)) of the present invention arbitrarily without any limitation as long as it can enhance the motivation for users to give tips, increase the strong sense of connection between the users and the tip recipients, and elevate the mere act of providing tips to a kind of event. Examples of forms of tip distribution may include cash, points, and virtual currency, as well as merchandise or videos, still images, picture, messages, texts, stories, or the like provided by specific individual or entity.

FIG. 3 shows an example of a program having different algorithms. Part (a) shows an example of a high-risk, high-return type algorithm. The tip recipient (20) receives 70% of the collected tips and a single recipient of distribution for the tip (22) is distributed with 30% of the tips. Part (b) shows an example of a low-risk, low-return type algorithm. The tip recipient (20) receives 60%. There are five recipients of distribution for the tip (22). Three recipients of distribution for the tip (22) are distributed with 10% each, and two recipients of distribution for the tip (22) are distributed with 5% each. Comparing to (a), more users receive distribution for the tips, but the amount of distribution for the tips for each user is smaller.

The one or more programs may be written in not only an internal storage device but also an external storage device such as a USB, ROM, or SD card.

The timing to select the foregoing one or more programs may be: immediately before the distribution; before the beginning of the tip provision by users (21); when the total amount of tips reaches a certain amount after the beginning of the tip provision; or when the number of users (21) providing tips reaches a certain number after the beginning of the tip provision.

The total amount of distribution from the tip recipient (20) to the recipient of distribution for the tip (22) may be selected by the tip recipient (20) from the options shown by the management server (10). The total amount of distribution may be determined based on a percentage with respect to the total amount of received tips, or it may be determined as an absolute amount.

The timing to determine the total amount of distribution may be: immediately before the distribution; before the beginning of an event for tip provision by users (21); after the end of an event for tip provision; when the total amount of tips reaches a certain amount after the beginning of the tip provision; or when the number of users (21) providing tips reaches a certain number after the beginning of the tip provision.

When the time of an event for tip provision ends regardless of the will of the tip recipient (20), such as, for example, a soccer game, the timing to make distribution may be immediately after the game ends. Further, when an event for tip provision is a video post on a website, as discussed later, and the end time of the event for tip provision can be determined based on the will of the tip recipient (20), the tip recipient (20) may freely determine the timing to make distribution.

Tips may be distributed to a third party (23) specified by the tip recipient (20) instead of users (21). The third party (23) may be an outside entity specified by the tip recipient (20). For example, if the tip recipient (20) is interested in environment protection, the tip recipient (20) may distribute part of the collected tips to an environmental organization, a third party (23). The tip recipient (20) may announce to users (21) the donation of tips to the environmental organization. Through the announcement of the donation, the tip recipient (20) may express his/her belief to users (21) as a message. This can enhance the motivation to provide tips, if users (21) sympathize with the message they have received. There may be more than one third party (23).

The system administrator (24) is not particularly limited, as long as they are a company, individual, or entity that operates the system, primarily the management server, of the present invention. There may be more than one system administrator (24).

The relation between the tip recipient (20) and the foregoing system is discussed.

Figure 4:
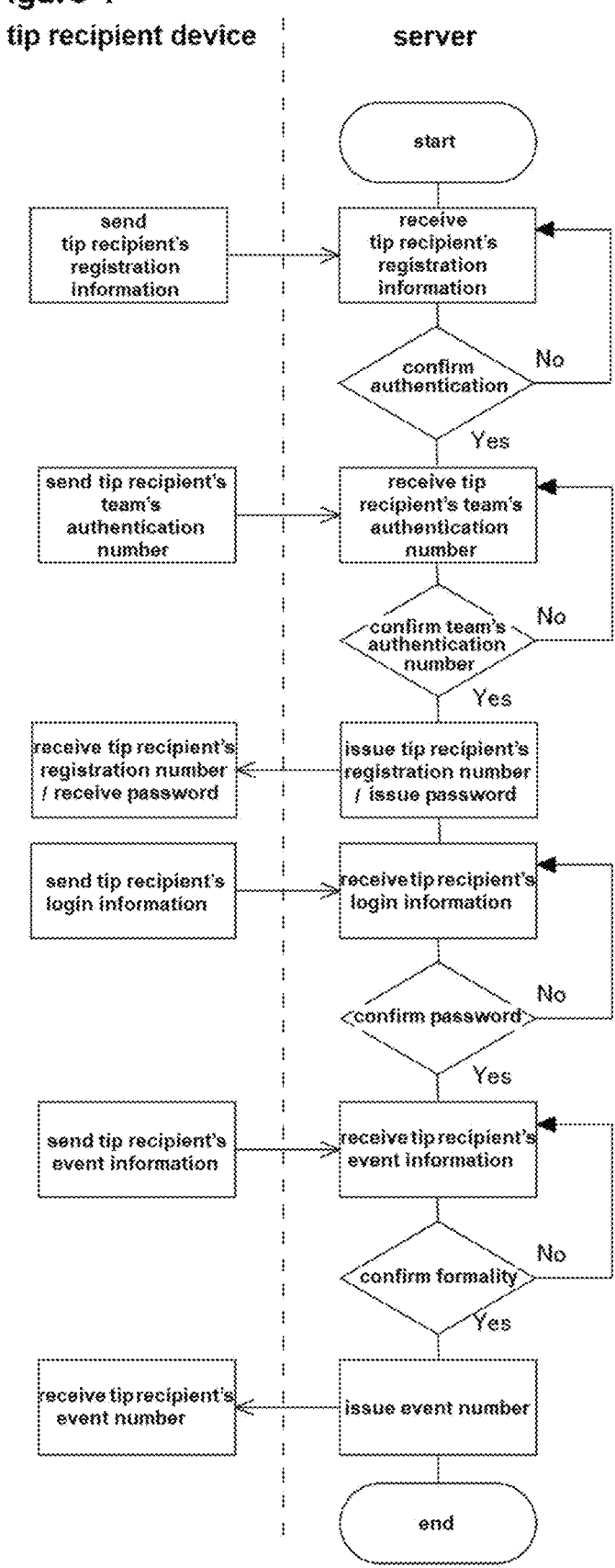
FIG. 4 is a view illustrating a flow chart illustrating the overall flow of the process implemented by the management server, and the information exchange between a tip recipient device and the management server of the first embodiment of the electronic transaction management system for providing a tip in accordance with the present invention.

FIG. 4 shows a flow chart showing the overall flow of the process implemented by the management server (10), and the information exchange between the tip recipient device (12) and the management server (10).

FIG. 5 shows a screen of device (12) of the tip recipient (20) in the present electronic transaction management system (1) for providing a tip.

First, the tip recipient A (20) registers himself/herself with the present electronic transaction management system (1) for providing a tip. Part (a) of FIG. 5 is a screen of the tip recipient device (12) for registering the tip recipient A (20). The tip recipient A (20) may input his/her name, contact information, and other matters necessary for identification in the system and/or upload a copy of a document necessary for identification, such as his/her driver's license, to the system.

After an examination, the present system may send a confirmation email to the email address inputted by the tip recipient A (20) or mail a confirmation document to the address inputted by the tip recipient A (20) via postal mail with no forwarding service, and complete the identification by a response thereto from the tip recipient A (20).

If the identification of the tip recipient A (20) is confirmed, a tip recipient registration number and a password may be provided to the tip recipient A (20).

If the tip recipient A (20) is a player who belongs to a team such as a soccer team, an authentication by the team may be required for the registration of the tip recipient A (20) to the system. Here, without the authentication by the team, the tip recipient A (20) cannot collect tips in any event associated with the team.

If the tip recipient A (20) obtains approval for the registration to the system from the affiliated team, the registration number of the "tip recipient A as a member of the team" may be constituted by a combination of the registration number of the affiliated team and the registration number of the individual acquired in advance. For example, if the registration number of the affiliated team is 123 and the registration number of the individual is 45678, the registration number of the "tip recipient A as a member of the team" is set to be 123-45678. That is, in any event associated with the team, the tip recipient A with the registration number of the individual of 45678 cannot organize an event for collecting tips, unless the tip recipient A (20) uses the number of 123-45678.

The tip recipient A (20) can request the team authority to issue a onetime authentication number to have the management server (10) authenticate that the tip recipient A (20) is a member of the team. The tip recipient A (20) may be proved to be a member of the team by inputting the authentication number issued from the team on the registration screen of the system. Since this authentication number is valid only for onetime use and for proving only the relation between the tip recipient A (20) and his/her affiliated team, tip recipients other than A cannot reuse this number to prove that he/she is a member of the foregoing affiliated team. Moreover, when the tip recipient A (20) leaves the affiliated team, the team has the authority to unilaterally invalidate the registration number of 123-45678 provided for the "tip recipient A as a member of the team".

Second, the tip recipient A (20) logs into the management server (10) through the tip recipient device (12) to launch an event X for tip provision according to, for example, the game in which the tip recipient A participates. The management server (10) requests the tip recipient A (20) for the password to allow log-in. The management server (10) confirms that the individual attempting to log in is the tip recipient A (20) by collating the entered password with the registered password. After the individual is confirmed to be tip recipient A (20), the tip recipient A (20) registers the event X for tip provision to the management server (10). The management server (10) provides an event number for the event X. This event number is valid only for the event X. The event number may be removed, for example, after the game, the event X, ends and the process for the distribution to users (21) is completed.

Part (b) of FIG. 5 is a registration screen of the event X organized by the tip recipient A (20), in particular, a registration screen where an event number (X98765) has been provided after the registration is completed. The tip recipient A (20) defines the event X to which users (21) provide tips. Elements to define the event X include the name of the event, the date of the event, the start time and the end time of the event, the selected timing for determining the amount to be distributed to users (21), the selected total amount of tips to be distributed to users (21), and the selected program to be used for selecting a recipient of distribution for the tip (22). Here, the method for specifying the total amount of tips to be distributed to users (21) may be specifying an absolute amount, or specifying a percentage with respect to the grand total of the collected tips. The management server (10) provides options at the stage of defining the event X, and the tip recipient A (20) selects the one that he/she thinks is appropriate from the options. In this example, the amount of distribution to users (21) is determined after the event X ends, and thus, the percentage or the amount of distribution to users (21) is not presented at this point.

Figure 6:
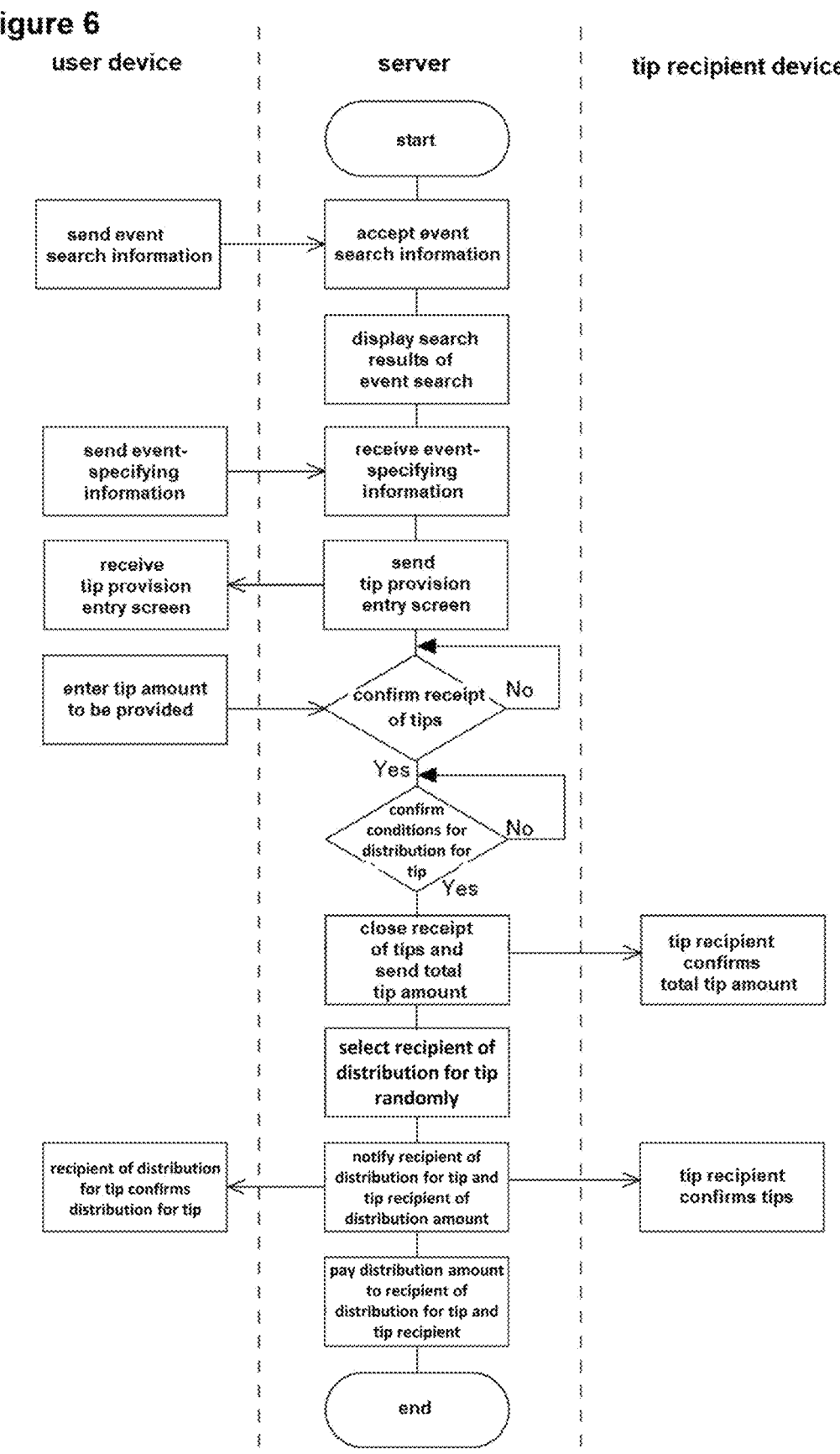
FIG. 6 is a view illustrating a flow chart illustrating the overall flow of the process implemented by the management server, and the information exchange among the user device, the tip recipient device, and the management server of the first embodiment of the electronic transaction management system for providing a tip in accordance with the present invention.

Next, the association of users (21) with the present electronic transaction management system (1) for providing a tip is discussed. FIG. 6 shows a flow chart showing the overall flow of the process implemented by the management server (10), and the information exchange among the user device (11), the tip recipient device (12) and the management server (10).

First, users (21) can look for an event to which they wish to provide tips on the search screen. Part (a) of FIG. 7 is a screen of the user device (11) on which a user (21) searches for an event. This screen shows the information (nationality, location, genre) of the tip recipient A (20) (123-45678), and a list of events to which the tip recipient A (20) invites users to provide tips, together with the event numbers.

Second, users (21) can touch the name of an event to refer to the tip provision entry screen for the foregoing event. Part (b) of FIG. 7 shows the tip provision entry screen. The tip provision entry screen displays amounts of tip to be provided to the tip recipient A (20) so that the user can select an amount. The user (21) can provide a tip to the tip recipient A (20) by selecting an amount of tip to be provided and then pressing the Transfer button. This system may be a mechanism in partnership with a credit card company, in which the tip is paid to the player via credit card.

When the tip recipient A (20) distributes part of the tips to a third party (23), that may be specified on the screen.

Part (c) of FIG. 7 shows a screen of the distribution for the tips. The amount of distribution to the recipient of distribution for the tip (22) may be displayed on the screen. The distribution does not need to be cash, and may be points or virtual currencies.

In this figure, a text is displayed as a message from the tip recipient A (20) to the recipient of distribution for the tip (22). Through this function, the tip recipient A (20) can increase the sense of connection with the recipient of distribution for the tip (22) by sending a message to the recipient of distribution for the tip. In addition, if the message can be shown to others, it becomes a kind of event in itself, and the recipient of distribution for the tip (22) comes to feel that the message itself is greatly valuable.

The recipient of distribution for the tip (22) may send a video, still image, and/or text as a message to the tip recipient A (20). The recipient of distribution for the tip (22) can express gratitude to the tip recipient A (20). Since this message is public to other users (21), the recipient of distribution for the tip (22) can liven up the tip provision and the distribution for the tip as an event.

Second Embodiment

Figure 8:
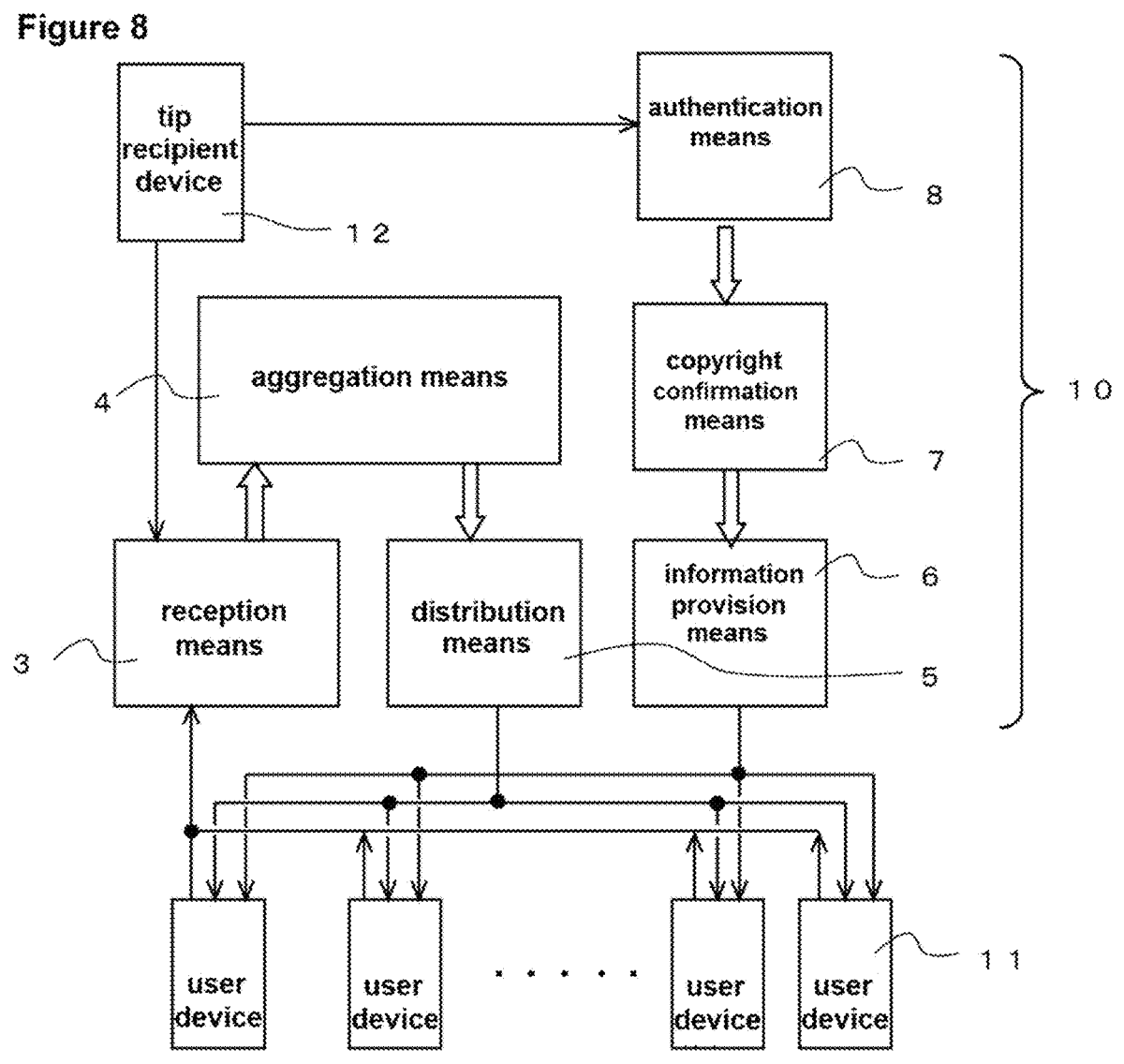

FIG. 8 shows a configuration of the second embodiment of an electronic transaction management system (1) for providing a tip. As compared with the fundamental configuration shown in FIG. 1, an information provision means (6) is incorporated into the second embodiment. The information provision means (6) includes a website. The tip recipient B (20) may post a video, still image, story, or picture on this website, and provide the video, still image, story, or picture to users (21) through the foregoing website. Users (21) watch the visual work, such as the video, still image, story, or picture posted on the information provision means (6), and they may provide tips to the creator of the visual work when they are impressed by this visual work. One difference between the first embodiment and the second embodiment is said to be found in that in the fundamental first embodiment shown in FIG. 1, the service for the users (21) is provided by a system different from the electronic transaction management system (1) for providing a tip, whereas in the second embodiment shown in FIG. 8, the service for the users (21) is also provided through a part of the electronic transaction management system (1) for providing a tip. For facilitating the understanding, the form of tip selected in the second embodiment is assumed to be (electronic) cash as in the first embodiment.

In the second embodiment shown in FIG. 8, the tip recipient B (20) can post a visual work, such as a video, still image, story, or picture, wherein a confirmation can be made as to whether it is really the tip recipient B (20) who is posting the visual work. If a confirmation is not made that it is really the tip recipient B (20) who is posting the visual work, for example, a non-party with a malicious intention, may impersonate the tip recipient B (20) and post a visual work that is not a work made by the tip recipient B (20), and thus, the non-party with a malicious intention may deceptively receive tips using the name of the tip recipient B (20). The present electronic transaction management system (1) for providing a tip comprises an authentication means (8) for confirming that the tip recipient B (20) is the foregoing individual, which can avoid the situations as mentioned above.

The easiest one among authentication means (8) for confirming that the tip recipient B (20) is the person himself/ herself is to design the present electronic transaction management system (1) for providing a tip so that the tip recipient B (20) logs in to the system via pre-authenticated password and a video can be posted only after the login via the password. Although it is under the premise that the confidentiality of the password is secured, such a means can ensure that the individual posting the video is the tip recipient B (20) himself/herself registered in the electronic transaction management system (1) for providing a tip.

Confirmation may be made that the copyright of the video, still image, story, or picture posted by the tip recipient B (20) on the website belongs to the tip recipient B (20). Even if it is certainly the tip recipient B (20) who has posted the visual work, there is no assurance that the visual work has been created by the tip recipient B (20). Problems will arise if the tip recipient B (20) gets tips by posting other individual's work. The present electronic transaction management system (1) for providing a tip comprises a copyright confirmation means (7) for confirming that the copyright of the posted visual work belongs to the tip recipient B (20), which can avoid the situations as mentioned above.

The easiest one among copyright confirmation means (7) for confirming that the copyright of the posted visual work belongs to the tip recipient B (20) is by means of a warning post on the website stating that "the poster is held responsible if the copyright of the posted visual work infringes on the copyright of others".

Figure 9:
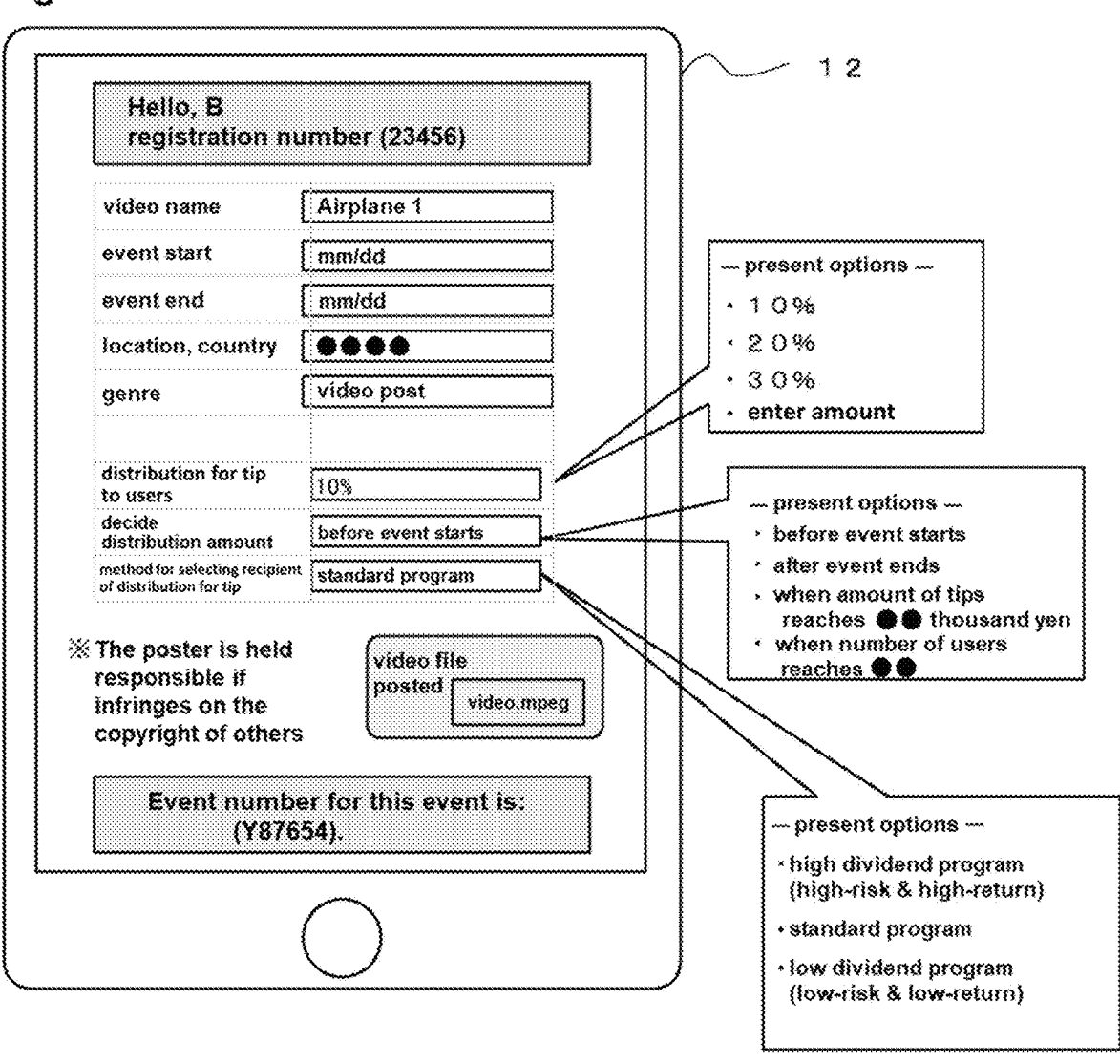
FIG. 9 is a view illustrating a device screen of the second embodiment of the electronic transaction management system for providing a tip in accordance with the present invention, depicting the tip recipient's event registration screen.

FIG. 9 shows a device (12) of the tip recipient (20) in the second embodiment shown in FIG. 8. The tip recipient B (20) performs registration of a video and registration of an event for tip provision Y on this screen.

It is assumed that registration of the tip recipient B (20) to the electronic transaction management system (1) for providing a tip has been completed. Since the system utilizes the same registration method as that shown in the first embodiment, the description is omitted.

The tip recipient B (20) defines the event Y to which a user (21) provides a tip, simultaneously upon the registration of the video. Elements for defining the event Y include the name of the video, the start time and the end time of the event Y, the nationality, the location, the genre, the selected timing for determining the amount or the percentage of tips to be distributed to users (21), the selected total amount of tips to be distributed to users (21), and the selected program to be used for selecting a recipient of distribution for the tip (22). Here, the method for specifying the total amount of tips to be distributed to users (21) may be specifying an absolute amount, or specifying a percentage with respect to the grand total of the collected tips. The management server (10) provides options for the definition of the event Y, and the tip recipient B (20) may select the one that he/she thinks is appropriate from the options. The start time and the end time of the event Y may be determined by the tip recipient (20). Since FIG. 9 shows the screen after the posting of a video, an event number (Y87654) has been provided by the management server (10). This event number is valid for the event Y only. The event number Y87654 may be removed, for example, after the game ends and the process for the distribution to users (21) is completed.

Figure 10:
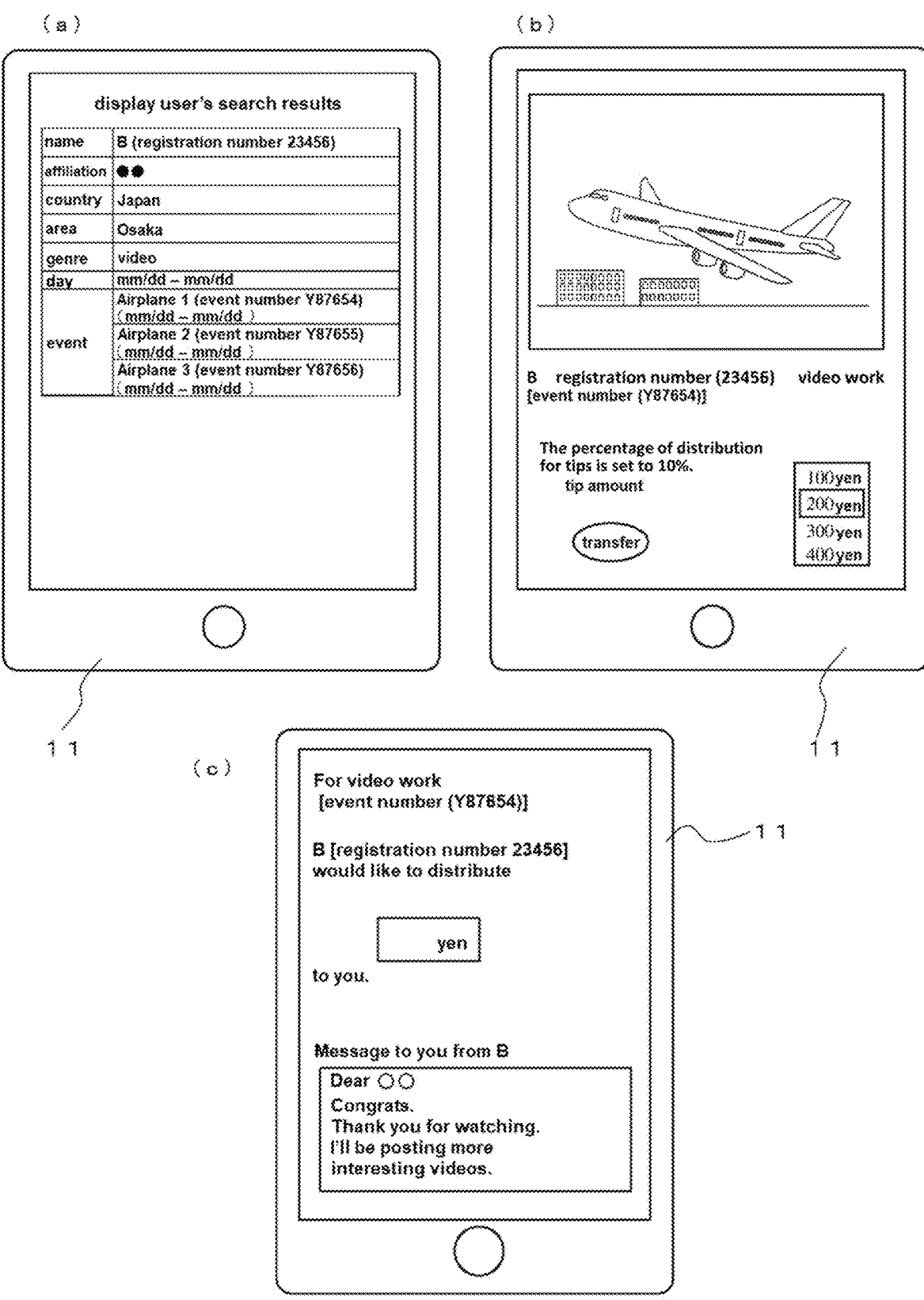
FIG. 10 is a view illustrating a device screen of the second embodiment of the electronic transaction management system for providing a tip in accordance with the present invention. Part (a) shows the user's search screen, part (b) shows the user's tip provision screen on which a video is provided by the tip recipient, and part (c) shows a tip distribution receipt screen.

Next, the association of users (21) with the present electronic transaction management system (1) for providing a tip is discussed. First, users (21) may search for an event to which they wish to provide tips on the search screen of the user device (11). Part (a) of FIG. 10 is a screen on which a user (21) searches for an event. This screen shows the information (nationality, location, genre) on the tip recipient B (20) (23456), and a list of events to which the tip recipient B (20) invites users to provide tips, together with the event numbers.

Second, users (21) can touch the event number to watch the video and further provide tips to the foregoing event. The screen of part (b) of FIG. 10 displays the video posted by the tip recipient B (20) and simultaneously allows a user to select an amount of tip to be provided to the tip recipient B (20). The user (21) can provide a tip to the tip recipient B (20) by selecting an amount of tip to be provided and then pressing the Transfer button. This system may be a mechanism in partnership with a credit card company, in which the tip is paid to the player via credit card.

Part (c) of FIG. 10 shows a screen of the distribution for the tips. The amount of distribution to the recipient of distribution for the tip (22) may be displayed on the screen. The distribution does not need to be cash, and may be points, virtual currencies, or the like.

In this figure, a text is displayed as a message from the tip recipient B (20) to the recipient of distribution for the tip (22).

The recipient of distribution for the tip (22) may send a video, still image, and/or text as a message to the tip recipient B (20).

Third Embodiment

Part (a) of FIG. 11 shows the display screen of a user device (11) in the third embodiment. As compared with the fundamental configuration shown in FIG. 1, an information provision means (6) is incorporated into the third embodiment. The information provision means (6) includes a website. For example, if the tip recipient (20) is a sport player, the tip recipient (20) may make his/her game available for viewing on the website, and display the total amount of aggregated tips and the total amount of distribution to users (21) on the website in real time. Users (21) can enjoy providing tips as an entertainment with high realistic sensation, since the users (21) can know the total amount of tips to be given to the tip recipient (20) and the total amount of distribution to users (21) while watching the performance of the player in the game displayed by the information provision means (6) in real time. The tip provision, when considered as a kind of event, can be expected to improve the interest, and as a result, enhance the motivation for users (21) to give tips. For facilitating the understanding, the form of tip selected in the third embodiment is assumed to be (electronic) cash as in the first and the second embodiment.

Here, the live video of the tip recipient (20) provided to users (21) may be filmed and streamed via the Internet by a third party (23) or an outsider upon personal request by the tip recipient (20).

Part (b) of FIG. 11 shows a screen of the distribution for the tips. The amount of distribution to the recipient of distribution for the tip (22) may be displayed on the screen. The distribution does not need to be cash, and may be points, virtual currencies, or the like.

In this figure, a text is displayed as a message from the tip recipient (20) to the recipient of distribution for the tip (22).

The recipient of distribution for the tip (22) may send a video, still image, and/or text as a message to the tip recipient (20).

In the first to the third embodiments, regardless of whether the amount is large or small, the management server (10) may confirm with the recipient of distribution for the tip (22) whether or not the recipient of distribution for the tip (22) wishes to receive distribution for the tips. The management server (10) may confirm with the tip recipient (20) whether or not the tip recipient (20) wishes to provide distribution for the tips to the recipient of distribution for the tip (22). In a situation where the recipient of distribution for the tip (22) responds that the tip distribution recipient (22) wishes to receive distribution for the tip and the tip recipient (20) responds that the tip recipient (20) wishes to provide distribution for the tip to the recipient of distribution for the tip (22), the management server (10) may make distribution for the tip to the recipient of distribution for the tip (22).

In other situations, that is, where the recipient of distribution for the tip (22) responds that the tip distribution recipient (22) does not wish to receive distribution for the tip or where the tip recipient (20) responds that the tip recipient (20) does not wish to provide distribution for the tip to the recipient of distribution for the tip (22), or these two responses overlap at a time, the management server (10) may allow the tip recipient (20) to select any one of the following:

(A) The management server (10) reselects a user other than the recipient of distribution for the tip (22) to be a new recipient of distribution for the tip (22);

(B) The tip recipient (20) receives the entire tips; and (C) The amount of distribution for the tips is carried over to the recipient of distribution for the tip (22) in the next tip distribution event.

Also, the recipients of distribution for the tip (22) selected in the first to the third embodiments may be selected from all users, including users who give a zero amount of tips, by the management server.

Figure 12:
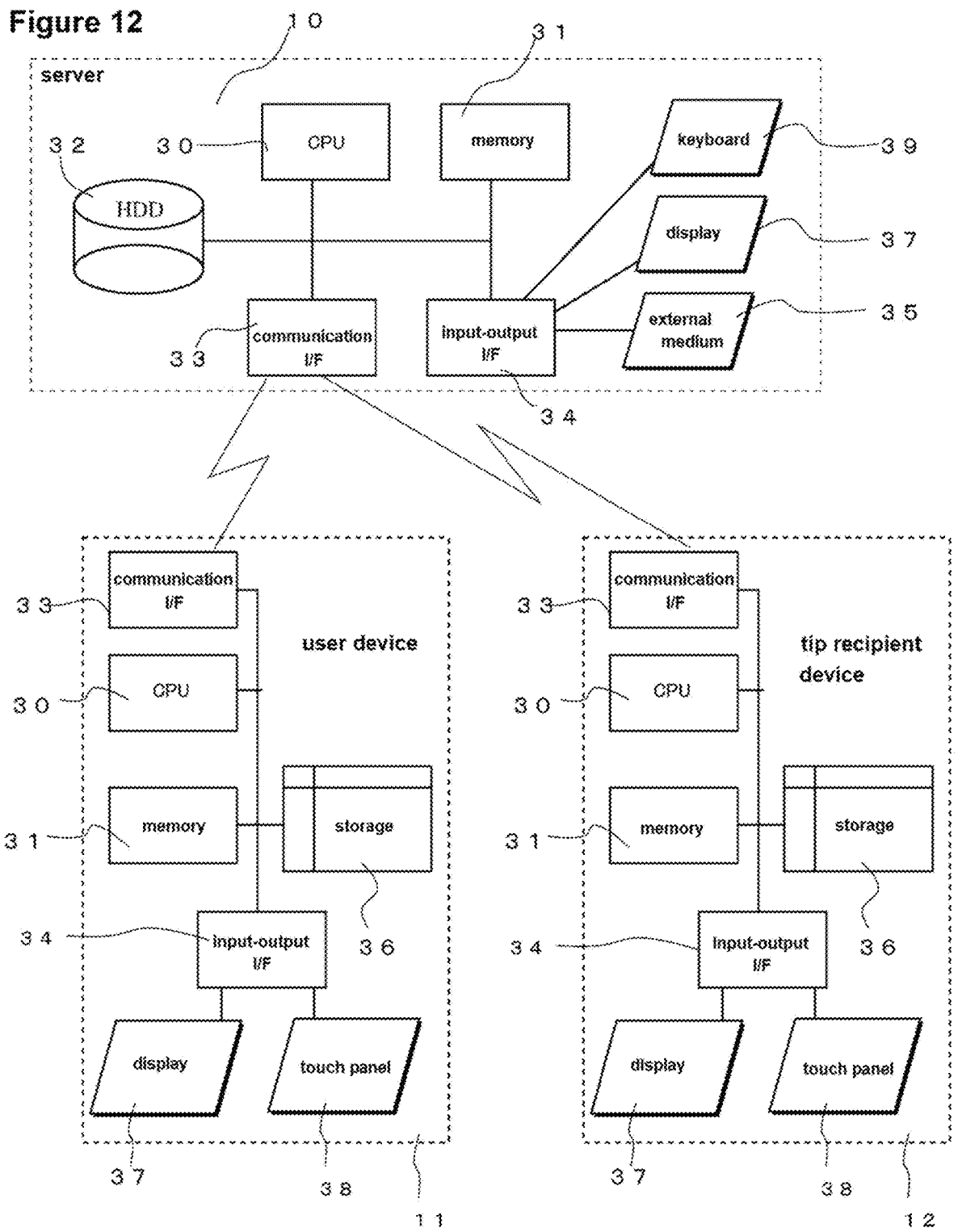
FIG. 12 is a view illustrating a hardware of an electronic transaction management system for providing a tip in accordance with the present invention.

FIG. 12 shows an example of the hardware configuration of the management server (10) in this embodiment.

The management server (10) is equipped with a Central Processing Unit (CPU) (30), a memory (31), a hard disk (32), a communication interface (I/F) (34), an input-output interface (I/F) (34), a display (37), and a keyboard (39).

The CPU (30) is operated by a program stored in the hard disk (32) to control each component. The hard disk (32) stores a program to be executed by the CPU (30) as well as data and the like to be used by the foregoing program.

The communication interface (33) sends data received from an external device via a communication line to the CPU (30) and transmits the data generated by the CPU (30) to the user device (11) and the tip recipient device (12) via a communication line.

The CPU (30) may obtain the program and data from the external medium (35) via the input-output interface (34).

The CPU (30) loads the foregoing program to the memory (31) and executes the loaded program. Example of the external medium (35) includes an optical storage medium, such as Digital Versatile Disc (DVD), a magnetic storage medium, a semiconductor memory, or the like.

The management server (10) achieves each function of the reception means (3), the aggregation means (4), the distribution means (5), the information provision means (6), the copyright confirmation means (7), and the authentication means (8) by executing the program loaded to the memory (31). Also, the hard disk (32) has data stored therein to be used by the above means.

Provided is the electronic transaction management program for providing a tip, stored in a file in an installable or executable format in a computer-readable storage medium, such as a CD-ROM, CD-R, memory card, or Digital Versatile Disc (DVD). Although the CPU (30) in the management server (10) executes these programs by reading them from the storage medium as mentioned above via the input-output interface (34), in another example the CPU (30) may obtain these programs via a communication line.

The user device (11) and the tip recipient device (12) comprise a CPU (30), a memory (31), a storage (36), a communication interface (34), an input-output interface (34), a display (37), and a touch panel (38).

The CPU (30) is operated by the program stored in the storage (36) to control each component. The storage (36) stores the program to be executed by the CPU (30) as well as data and the like to be used by the foregoing program. The communication interface (33) sends data received from the management server (10) via a communication line to the CPU (30) and transmits the data generated by the CPU (30) to the management server (10) via a communication line.

The input-output interface (34) sends data entered through the touch panel (38) to the CPU (30) and displays the data generated by the CPU (30) on the display (37).

Fourth Embodiment

Figure 13:
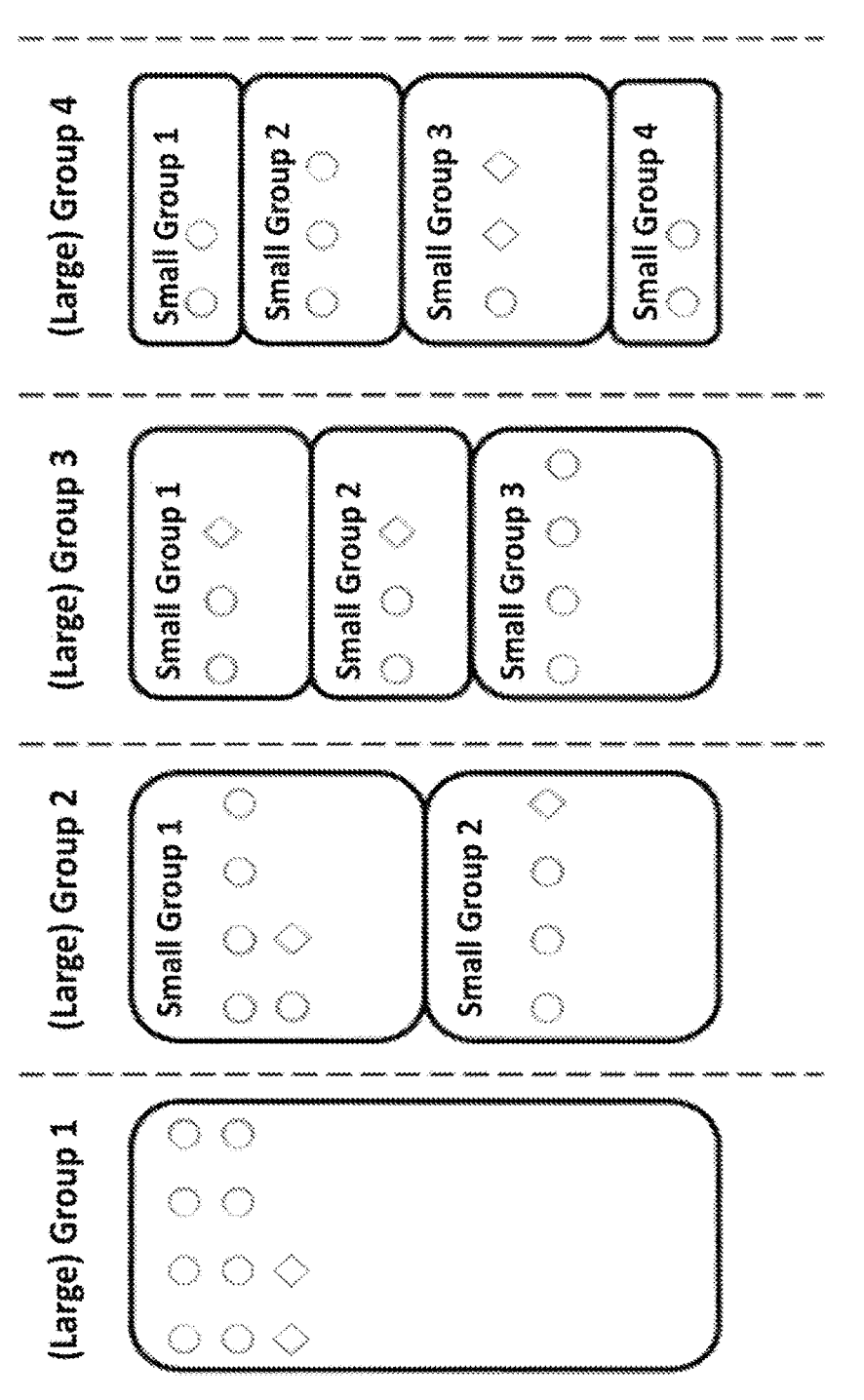
FIG. 13 is a view illustrating an example of selecting two recipients of distribution for the tip from a total of ten users, in accordance with the present invention.

FIG. 13 shows an example of selecting two recipients of distribution for the tip (22) from a total of ten users (21), according to the present invention. In this example, the total of users (21) is divided into groups according to the amount of tips (cash), the form of the tip distribution is cash, and the percentage of tips distribution for each recipient of distribution for the tip (22) are the same.

When a recipient of distribution for the tip (22) is to be selected, the management server (10) presents one or more groups to classify users (21). In the fourth embodiment, the management server (10) presented group 1 to group 4, but the management server (10) can present up to group 10, which is equal to the total number of users (21) (ten people). In other words, with a total of ten users (21) in FIG. 13, when the presented groups are defined as group 1, group 2, . . . , group n (n is a positive integer), respectively, n is at most 10.

Since group 2 to group 4 are subdivided, the subdivided groups are defined as small group 1, small group 2, small group 3, and small group 4, respectively. In the fourth embodiment, a group can be divided into up to small group 10, which is equal to the total number of users (21). In other words, with a total of ten users (21) in FIG. 13, when the presented small groups are defined as small group 1, small group 2, . . . , small group m (m is a positive integer), respectively, m is at most 10.

When groups are subdivided, the groups before being subdivided (group 2 to group 4) are defined as large group 2, large group 3, and large group 4. Although group 1 is not subdivided, it may be defined as large group 1 to unify the designation with other large groups.

In the situation where two recipients of distribution for the tip (22) are to be selected from the total of ten users (21), if the management server (10) or the tip recipient (20) selects group 1, the management server (10) randomly selects two recipients of distribution for the tip (22) from group 1.

If the management server (10) or the tip recipient (20) selects group 2, and the management server (10) or the tip recipient (20) determines that one recipient of distribution for the tip (22) is to be selected from small group 1 and one recipient of distribution for the tip (22) is to be selected from small group 2, the management server (10) randomly selects one recipient of distribution for the tip (22) from small group 1 and one recipient of distribution for the tip (22) from small group 2.

If the management server (10) or tip recipient (20) selects group 3, and the management server (10) or tip recipient (20) determines that one recipient of distribution for the tip (22) is to be selected from small group 1 and one recipient of distribution for the tip (22) is to be selected from small group 2, the management server (10) randomly selects one recipient of distribution for the tip (22) from small group 1 and one recipient of distribution for the tip (22) from small group 2.

If the management server (10) or tip recipient (20) selects group 4, and the management server (10) or tip recipient (20) determines that two recipients of distribution for the tip (22) are to be selected from small group 3, the management server (10) randomly selects two recipients of distribution for the tip (22) from small group 3.

For easy explanation, in the selection of recipients of distribution for the tip (22) in the fourth embodiment, groups are subdivided according to the amount of cash (tips), the form of the tip distribution is cash, and the percentage of tips distribution for each recipient of distribution for the tip are the same. In addition, other forms (for example, points, and virtual currency, as well as merchandise or videos, still images, pictures, messages, texts, stories, or the like provided by a specific individual or entity) of tips may be selected, the tips to be distributed may be in a form other than cash, and the form of the tips to be distributed and the percentage of tips distribution may be changed for each recipient of distribution for the tip. Also, where cash, points, or virtual currency is selected as the tip, the recipient of distribution for the tip (22) may be selected from the total of users (21) including users for which the amount of cash, the amount of virtual currency, or the number of points for the tip is zero.

INDUSTRIAL APPLICABILITY

The present invention is suitably utilized to provide an electronic transaction management system for providing a tip, that enables the users and the tip recipient to smoothly send and receive tips, even when located away from each other; that enables part of the total tips to be distributed to a user randomly selected from all users; that can be expected to improve the interest due to the expectations for the distribution since the amount of the distribution for the tip may have a value exceeding the amount of the tip a user has provided and may be so large that it is unpredictable by the user, and as a result, enhance the motivation for users to give tips; that enables increasing the strong sense of connection between the users and the tip recipients; and that enables elevating the mere act of providing tips to a kind of event.

EXPLANATIONS OF REFERENCES 1 electronic transaction management system for providing a tip
3 reception means
4 aggregation means
5 distribution means
6 information provision means
7 copyright confirmation means
8 authentication means
10 management server
11 user device
12 tip recipient device
20 tip recipient
21 user
22 recipient of distribution for the tip
23 third party
24 system administrator

What is claimed is:
1. An electronic transaction management system for providing a tip to a specific individual or entity, the system comprising:
a management server comprising a CPU and a memory, at least one user device corresponding to a user and connected with the management server through a communication line, at least one tip recipient device accessible by at least one tip recipient, a third party designated by the tip recipient, and a system administrator, wherein the at least one user device is configured to transmit to the management server, a name of the at least one tip recipient that the user wishes to tip, a type of tip, and an amount or a number of points for the tip, being inputted by the user, wherein the management server comprises:

a reception program configured to receive at least one of an arbitrary type of tip and amount or number of points for the tip, and the name of the at least one tip recipient through a communication interface, all of which are transmitted from the at least one user device;

an aggregation program configured to aggregate types of tips and amounts or numbers of points for the tips for the name of the at least one tip recipient inputted in the reception program, wherein the management server is configured to present one or more groups to classify users based on at least one of the types of tips and the amounts or the numbers of points for the tips aggregated by the aggregation program; and a distribution program configured to randomly select a recipient of distribution for the tip from the group selected by the management server or the tip recipient, by executing a program for selecting the recipient of distribution for the tip randomly and for distributing an arbitrary percentage, an arbitrary amount, or other forms of the tip to the recipient of distribution for the tip, and distributes a remaining percentage, a remaining amount, or other forms of the tip to at least one of the tip recipient, the third party designated by the tip recipient, and the system administrator, wherein the management server presents, to the at least one tip recipient, a plurality of proposals indicating an arbitrary percentage, an arbitrary amount, or other forms related to the tip to be distributed to the recipient of distribution for the tip, so that the at least one tip recipient can select, prior to the distribution of the tip to the recipient of distribution for the tip, wherein the tip is selected from at least one of cash, points, virtual currency, mark, and message, wherein if cash, points, or virtual currency is selected as the tip, a monetary amount of cash, a monetary amount of virtual currency, or the number of points may be zero, wherein the management server selects the recipient of distribution for the tip from among users including users whose tip amount is zero, and wherein the tip is distributed to the at least one tip recipient via the at least one tip recipient device.

2. The electronic transaction management system of claim 1, wherein the management server presents, to the at least one tip recipient, a proposal of one or more groups to present a number of recipients of distribution for the tip and a percentage of distribution for the tip so that the at least one tip recipient can select, wherein the selection of the recipient of distribution for the tip is made through random selection within the selected group by the management server.

3. The electronic transaction management system of claim 1, wherein, when users in the selected group are subdivided and grouped based on at least one of the type of tip and the amount or the number of points for the tip, the at least one tip recipient determines, for each subdivided group, at least one of the number of recipients of distribution for the tip to be selected, an amount or percentage of distribution for the tip, a type of tip distribution, and an amount or percentage of distribution for the tip for each recipient of distribution for the tip to be selected.

4. The electronic transaction management system of claim 1, wherein the management server further comprises an information provision program configured to allow the at least one tip recipient to post a video, still image, story, or picture on a website of the system, a copyright of which is owned by the at least one tip recipient, and to provide the video, still image, story, or picture to the user through the website.

5. The electronic transaction management system of claim 1, wherein the management server further comprises an authentication program configured to confirm that the at least one tip recipient is the individual.

6. The electronic transaction management system of claim 1, wherein the management server further comprises a copyright confirmation program configured to confirm that a copyright of a video, still image, story, or picture posted on a website by the at least one tip recipient belongs to the at least one tip recipient.

7. The electronic transaction management system of claim 1, wherein the aggregation program is further configured to display, on a website in real time, a total amount of aggregated tips and an amount to be distributed to the recipient of distribution for the tip based on a total amount and a percentage of distribution to the recipient of distribution for the tip.

8. The electronic transaction management system of claim 1, wherein the distribution program is configured to select the recipient of distribution for the tip by executing a program for selecting the recipient of distribution for the tip randomly, and wherein the program comprises:

a random number generator for generating a random number, a table creator for assigning each user to each random number generated by the random number generation means, and a selector for selecting a user who has been assigned a random number beyond a reference value, as a recipient of distribution for the tip.

9. The electronic transaction management system of claim 1, wherein the management server is further configured to allow the at least one tip recipient to transmit a video, still image, and/or text as a message to either the user or the recipient of distribution for the tip, or both.

10. The electronic transaction management system of claim 1, wherein the management server is further configured to allow either the user or the recipient of distribution for the tip, or both to transmit a video, still image, and/or text as a message to the at least one tip recipient.

11. An electronic transaction management system for providing a tip to a specific individual or entity, the system comprising:

a management server comprising a CPU and a memory, at least one user device corresponding to a user and connected with the management server through a communication line, at least one tip recipient device accessible by at least one tip recipient, a third party designated by the tip recipient, and a system administrator, wherein the at least one user device is configured to transmit to the management server, a name of the at least one tip recipient that the user wishes to tip, a type of tip, and an amount or a number of points for the tip, being inputted by the user, wherein the management server comprises:

a reception program configured to receive at least one of an arbitrary type of tip and amount or number of points for the tip, and the name of the at least one tip recipient through a communication interface, all of which are transmitted from the at least one user device;

an aggregation program configured to aggregate types of tips and amounts or numbers of points for the tips for the name of the at least one tip recipient inputted in the reception program, wherein the management server is configured to present one or more groups to classify users based on at least one of the types of tips and the amounts or the numbers of points for the tips aggregated by the aggregation program; and a distribution program configured to randomly select a recipient of distribution for the tip from the group selected by the management server or the tip recipient, by executing a program for selecting the recipient of distribution for the tip randomly and for distributing an arbitrary percentage, an arbitrary amount, or other forms of the tip to the recipient of distribution for the tip, and distributes a remaining percentage, a remaining amount, or other forms of the tip to at least one of the tip recipient, the third party designated by the tip recipient, and the system administrator, wherein the management server presents, to the at least one tip recipient, a plurality of proposals indicating an arbitrary percentage, an arbitrary amount, or other forms related to the tip to be distributed to the recipient of distribution for the tip, so that the at least one tip recipient can select, prior to the distribution of the tip to the recipient of distribution for the tip, wherein the tip is selected from at least one of cash, points, virtual currency, mark, and message, wherein if cash, points, or virtual currency is selected as the tip, a monetary amount of cash, a monetary amount of virtual currency, or the number of points may be zero, wherein the management server presents, to the at least one tip recipient, a proposal of one or more groups to present a number of recipients of distribution for the tip and a percentage of distribution for the tip so that the at least one tip recipient can select, and wherein the selection of the recipient of distribution for the tip is made through random selection within the selected group by the management server, wherein the management server selects the recipient of distribution for the tip from among users including users whose tip amount is zero, and wherein the tip is distributed to the at least one tip recipient via the at least one tip recipient device.

12. The electronic transaction management system of claim 11, wherein, when users in the selected group are subdivided and grouped based on at least one of the type of tip and the amount or the number of points for the tip, the at least one tip recipient determines, for each subdivided group, at least one of the number of recipients of distribution for the tip to be selected, an amount or percentage of distribution for the tip, a type of tip distribution, and an amount or percentage of distribution for the tip for each recipient of distribution for the tip to be selected.

13. The electronic transaction management system of claim 11, wherein the management server further comprises an information provision program configured to allow the at least one tip recipient to post a video, still image, story, or picture on a website of the system, a copyright of which is owned by the at least one tip recipient, and to provide the video, still image, story, or picture to the user through the website.

14. The electronic transaction management system of claim 11, wherein the management server further comprises an authentication program configured to confirm that the at least one tip recipient is the individual.

15. The electronic transaction management system of claim 11, wherein the management server further comprises a copyright confirmation program configured to confirm that a copyright of a video, still image, story, or picture posted on a website by the at least one tip recipient belongs to the at least one tip recipient.

16. The electronic transaction management system of claim 11, wherein the aggregation program is further configured to display, on a website in real time, a total amount of aggregated tips and an amount to be distributed to the recipient of distribution for the tip based on a total amount and a percentage of distribution to the recipient of distribution for the tip.

17. The electronic transaction management system of claim 11, wherein the distribution program is configured to select the recipient of distribution for the tip by executing a program for selecting the recipient of distribution for the tip randomly, and wherein the program comprises:

a random number generator for generating a random number, a table creator for assigning each user to each random number generated by the random number generation means, and a selector for selecting a user who has been assigned a random number beyond a reference value, as a recipient of distribution for the tip.

18. The electronic transaction management system of claim 11, wherein the management server is further configured to allow the at least one tip recipient to transmit a video, still image, and/or text as a message to either the user or the recipient of distribution for the tip, or both.

19. The electronic transaction management system of claim 11, wherein the management server is further configured to allow either the user or the recipient of distribution for the tip, or both to transmit a video, still image, and/or text as a message to the at least one tip recipient.

* * * * *